US011836657B2

(12) United States Patent
Maekawa et al.

(10) Patent No.: US 11,836,657 B2
(45) Date of Patent: Dec. 5, 2023

(54) RESOURCE MANAGEMENT PLANNING SUPPORT DEVICE, RESOURCE MANAGEMENT PLANNING SUPPORT METHOD, AND PROGRAMS

(71) Applicant: HITACHI, LTD., Tokyo (JP)

(72) Inventors: Yuki Maekawa, Tokyo (JP); Tomoe Tomiyama, Tokyo (JP); Kenichiro Okada, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/642,151

(22) PCT Filed: Sep. 10, 2020

(86) PCT No.: PCT/JP2020/034261
§ 371 (c)(1),
(2) Date: Mar. 10, 2022

(87) PCT Pub. No.: WO2021/090572
PCT Pub. Date: May 14, 2021

(65) Prior Publication Data
US 2022/0327451 A1    Oct. 13, 2022

(30) Foreign Application Priority Data
Nov. 8, 2019  (JP) .................................. 2019-203593

(51) Int. Cl.
*G06Q 10/0631* (2023.01)
*G06Q 50/30* (2012.01)

(52) U.S. Cl.
CPC .. *G06Q 10/06312* (2013.01); *G06Q 10/06311* (2013.01); *G06Q 10/06313* (2013.01); *G06Q 50/30* (2013.01)

(58) Field of Classification Search
None
See application file for complete search history.

(56) References Cited

U.S. PATENT DOCUMENTS 4,926,343 A * 5/1990 Tsuruta .................... B61L 27/12
706/45
7,734,493 B1 * 6/2010 Anbil ............... G06Q 10/06312
705/7.22
(Continued)

FOREIGN PATENT DOCUMENTS

JP    11-143938 A    5/1999
JP    2005-178742 A   7/2005
(Continued)

OTHER PUBLICATIONS

D. Corman, Francesco, and Lingyun Meng. "A review of online dynamic models and algorithms for railway traffic management." IEEE Transactions on Intelligent Transportation Systems 16.3 (2014): 1274-1284 (Year: 2014).*

(Continued)

Primary Examiner — Darlene Garcia-Guerra
(74) Attorney, Agent, or Firm — Volpe Koenig

(57) ABSTRACT

Disclosed is a resource management planning support device 1 including a learning information storage section (storage section 13), a duty recommendation processing section 110, a planning processing section (operation rescheduling planning processing section 120), and a screen processing section 140. The learning information storage section stores plan result information regarding existing operation rescheduling plans. The duty recommendation processing section 110 exercises a prior learning function to generate a duty recommendation model for recommending a duty. The planning processing section exercises a planning function to create an operation rescheduling plan by selecting a duty template suitable for a planning target train set according to the duty recommendation model generated by the duty recommendation processing section 110. The screen processing section 140 outputs a plan result display (Continued)

screen 147 for displaying the operation rescheduling plan created by the planning processing section.

13 Claims, 21 Drawing Sheets

(56) References Cited

U.S. PATENT DOCUMENTS

| | | | |
|---|---|---|---|
| 10,773,741 B2* | 9/2020 | Rosti | B61L 27/10 |
| 2006/0074544 A1* | 4/2006 | Morariu | G06Q 10/047 |
| | | | 701/19 |
| 2010/0023190 A1* | 1/2010 | Kumar | B61L 27/40 |
| | | | 701/20 |
| 2012/0089432 A1* | 4/2012 | Podgurny | G06Q 10/06311 |
| | | | 705/7.13 |
| 2014/0088865 A1* | 3/2014 | Thies | G01C 21/34 |
| | | | 701/465 |
| 2018/0047124 A1* | 2/2018 | Zyngier | G06Q 10/067 |
| 2018/0118238 A1* | 5/2018 | de Albuquerque Gleizer | |
| | | | B61L 15/0027 |
| 2022/0348242 A1* | 11/2022 | Vujanic | B61L 27/12 |

FOREIGN PATENT DOCUMENTS

| | | |
|---|---|---|
| JP | 2007-196880 A | 8/2007 |
| JP | 2008-221918 A | 9/2008 |
| JP | 2016-203873 A | 12/2016 |

OTHER PUBLICATIONS

Wu, Jianqing, et al. "Towards a general prediction system for the primary delay in urban railways." 2019 IEEE Intelligent Transportation Systems Conference (ITSC). IEEE, 2019 (Year: 2019).*

International Search Report, PCT/JP2020/034261, dated Nov. 10, 2020 (2 pgs.).

* cited by examiner

FIG.2

[PLANNING INFORMATION]                                      201

PLANNING TARGET DATE: YYYY-MM-DD

| TRAIN SET ID | STARTING STATION | TERMINAL STATION | VEHICLE TYPE | WORK 1 | ... |
|---|---|---|---|---|---|
| I | STATION i | STATION iii | P | PRESENT | ... |
| II | STATION ii | STATION iii | P | ABSENT | ... |
| ... | ... | ... | ... | ... | ... |

FIG. 3

[LEARNING PLAN RESULT INFORMATION] 202

[PLAN RESULT INFORMATION] 2021

PLANNING TARGET DATE: YYYY-MM-DD    13:00

ORIGINAL RUNWAY: A
TRAIN SET I
TRAIN 1 → TRAIN 4 → TRAIN 7
             ↓         ↑
             ↓       TRAIN 8

ORIGINAL RUNWAY: B
TRAIN SET II
TRAIN 2 → TRAIN 5

ORIGINAL RUNWAY: C
TRAIN SET III
TRAIN 3 → TRAIN 6

— ORIGINAL RUNWAY
━ OPERATION-RESCHEDULED RUNWAY

[RUNWAY INFORMATION] 2022

| ORDER | ORIGINAL RUNWAY ID | IN-RUNWAY ORDER | ARRIVAL STATION | TRAIN ROUTE TYPE | TRAIN TYPE | TRAIN NUMBER |
|---|---|---|---|---|---|---|
| 1 | A | 0 | STATION i | TOWARD A, UP LINE | LOCAL | TRAIN 1 |
| 2 | B | 1 | STATION ii | TOWARD B, DOWN LINE | LOCAL | TRAIN 5 |
| 3 | A | 2 | STATION iii | TOWARD A, UP LINE | LOCAL | TRAIN 7 |

[PLAN EVALUATION VALUE] 2023

| EVALUATION ITEM | EVALUATION VALUE |
|---|---|
| OPERATION RESTRICTION COMPLIANCE RATE | 90% |
| ... | ... |

FIG. 4

[RUNWAY LEARNING DATASET INFORMATION] 203

[INPUT FORMAT] 2031

| CATEGORY | INPUT VALUE ITEM | STATE |
|---|---|---|
| INDIVIDUAL TRAIN SET | STARTING STATION | VALID |
| INDIVIDUAL TRAIN SET | TERMINAL STATION | VALID |
| INDIVIDUAL TRAIN SET | OVERNIGHT STAY STATION | VALID |
| INDIVIDUAL TRAIN SET | VEHICLE TYPE | VALID |
| INDIVIDUAL TRAIN SET | PRESENCE/ABSENCE OF WORK 1 | VALID |
| ... | ... | ... |
| OVERALL PLAN | NUMBER OF TRAIN SETS | VALID |
| OVERALL PLAN | PRESENCE/ABSENCE OF LARGE-SCALE INSPECTION | VALID |
| OVERALL PLAN | NUMBER OF DRIVERS | INVALID |
| ... | ... | ... |
| EXTERNAL ENVIRONMENT | WEATHER | INVALID |
| EXTERNAL ENVIRONMENT | SNOW ACCUMULATION | VALID |
| ... | ... | ... |

[TRAIN SET INPUT VALUE] 2032

TRAIN SET ID: 1

| INPUT VALUE ITEM | ACTUAL INPUT VALUE |
|---|---|
| STARTING STATION | STATION i |
| TERMINAL STATION | STATION iii |
| STAY STATION | STATION iii |
| VEHICLE TYPE | P |
| PRESENCE/ABSENCE OF WORK 1 | PRESENT (1) |
| ... | ... |
| NUMBER OF TRAIN SETS | 40 |
| PRESENCE OF LARGE-SCALE INSPECTION | PRESENT (1) |
| NUMBER OF DRIVERS | - |
| ... | ... |
| WEATHER | - |
| SNOW ACCUMULATION | 0% |
| ... | ... |

[RUNWAY TEMPLATE] 2033

RUNWAY TEMPLATE IDENTIFICATION NUMBER: 1

| ORDER | ORIGINAL RUNWAY ID | IN-RUNWAY ORDER | ARRIVAL STATION | TRAIN ROUTE TYPE | TRAIN TYPE |
|---|---|---|---|---|---|
| 1 | A | 0 | STATION i | TOWARD A, UP LINE | LOCAL |
| 2 | B | 1 | STATION ii | TOWARD B, DOWN LINE | LOCAL |
| 3 | A | 2 | STATION iii | TOWARD A, UP LINE | LOCAL |

[RUNWAY GROUND TRUTH VALUE] 2034

TRAIN SET ID: 1

| RUNWAY TEMPLATE IDENTIFICATION NUMBER | CORRESPONDENCE |
|---|---|
| 1 | CORRESPONDING (1) |
| 2 | NONCORRESPONDING (0) |
| 3 | NONCORRESPONDING (0) |
| ... | ... |

FIG. 5

[RUNWAY RECOMMENDATION MODEL INFORMATION] 204

[INPUT FORMAT] 2041

| CATEGORY | INPUT VALUE ITEM | STATE |
|---|---|---|
| ... | ... | ... |
| ... | ... | ... |

[CLASSIFIER] 2042

| | | |
|---|---|---|
| ... | ... | ... |
| ... | ... | ... |

[RUNWAY TEMPLATE] 2043

RUNWAY TEMPLATE IDENTIFICATION NUMBER: 1

| ORDER | ORIGINAL RUNWAY ID | IN-RUNWAY ORDER | ARRIVAL STATION | TRAIN ROUTE TYPE | TRAIN TYPE |
|---|---|---|---|---|---|
| 1 | ... | ... | ... | ... | ... |
| 2 | ... | ... | ... | ... | ... |
| ... | ... | ... | ... | ... | ... |

[ATTRIBUTE INFORMATION] 2044

| NAME | CREATION DATE AND TIME | TAG | MEMO |
|---|---|---|---|
| MODEL A | YYYY-MM-DD HH:MM | YYYY FISCAL YEAR COMPLIANT / FOR REGULAR DAYS | YYYY FISCAL YEAR TRAIN SCHEDULE |

FIG. 6

[PLANNING TARGET TRAIN SET INFORMATION]　　　　　　　　　　　　　　　205

| TRAIN SET ID | STARTING STATION | TERMINAL STATION | VEHICLE TYPE | WORK 1 | ... |
|---|---|---|---|---|---|
| I | STATION i | STATION iii | P | PRESENT | ... |
| II | ... | ... | ... | ... | ... |
| ... | ... | ... | ... | ... | ... |

FIG. 7

[RUNWAY TEMPLATE PRIORITY LIST INFORMATION]　　　　　　　　　　　206

| RUNWAY TEMPLATE IDENTIFICATION NUMBER | PRIORITY LEVEL (0-1) |
|---|---|
| 1 | 0.8 |
| 2 | 0.1 |
| 3 | 0.05 |
| ... | ... |

FIG.13

SELECT INPUT FORMAT FOR RUNWAY RECOMMENDATION MODEL CREATION

· INPUT INFORMATION REGARDING INDIVIDUAL TRAIN SET

| SELECTION | NAME |
|---|---|
| ◉ | STARTING STATION |
| ◉ | TERMINAL STATION |
| ◉ | STAY STATION |
| ◉ | VEHICLE TYPE |
| ◉ | PRESENCE/ABSENCE OF WORK 1 |
| ◉ | PRESENCE/ABSENCE OF WORK 2 |
| ... | ... |

· INPUT INFORMATION REGARDING OVERALL PLAN

| | |
|---|---|
| ◉ | NUMBER OF TRAIN SETS |
| ◉ | PRESENCE/ABSENCE OF LARGE-SCALE INSPECTION |
| ○ | NUMBER OF DRIVERS |
| ○ | ... |

· INPUT FORMATION REGARDING EXTERNAL ENVIRONMENT

| | |
|---|---|
| ○ | WEATHER |
| ◉ | SNOW ACCUMULATION |
| | ... |

| READ INPUT FORMAT DESIGNATION FILE | START LEARNING | EXIT |

FIG.14

STORE CREATED RUNWAY RECOMMENDATION MODEL

| | |
|---|---|
| CREATION DATE AND TIME | YYYY-MM-DD HH:MM |
| NAME | MODEL A |
| TAG | YYYY FISCAL YEAR COMPLIANT · FOR REGULAR DAYS · + ADD TAG |
| MEMO | COMPLIANT WITH YYYY FISCAL YEAR TRAIN SCHEDULE |

SAVE AND EXIT

FIG. 16
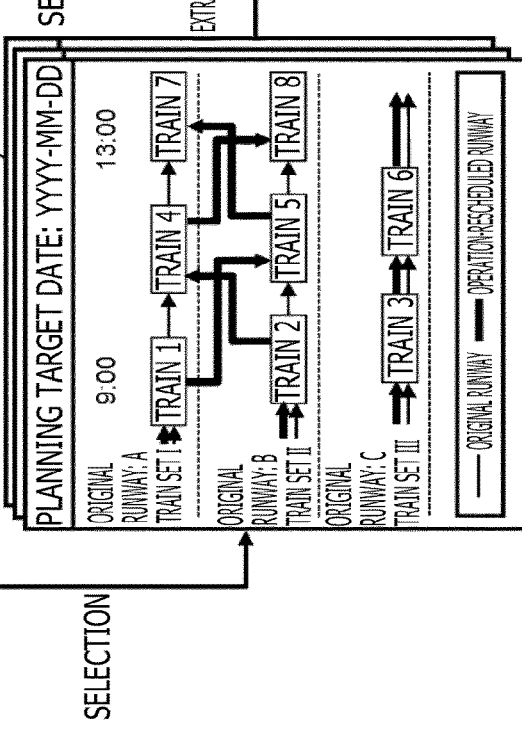
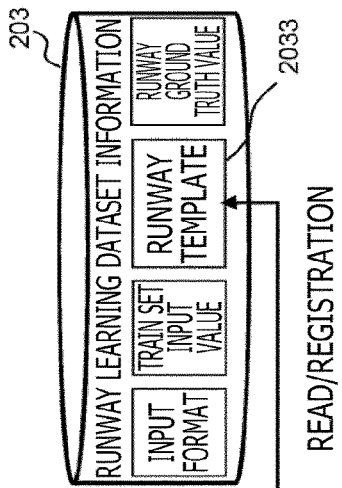

FIG.20

SELECT PLAN INFORMATION FOR PLANNING

| SELECTION | DATE | MEMO |
|---|---|---|
| ⦿ | YYYY-MM-DD | REGULAR DAY |
| ○ | YYYY-MM-DD | BUSY DAY |

[NEXT] [EXIT]

FIG.21

SELECT RUNWAY RECOMMENDATION MODEL TO BE USED

| SELECTION | NAME | CREATION DATE AND TIME | TAG | MEMO |
|---|---|---|---|---|
| ⦿ | MODEL A | YYYY-MM-DD HH:MM | YYYY FISCAL YEAR COMPLIANT / FOR REGULAR DAYS | YYYY FISCAL YEAR TRAIN SCHEDULE |
| ○ | MODEL B | YYYY-MM-DD HH:MM | COMPLIANT WITH YYYZ FISCAL YEAR | — |

[READ RUNWAY RECOMMENDATION MODEL DESIGNATION FILE] [START PLANNING] [EXIT]

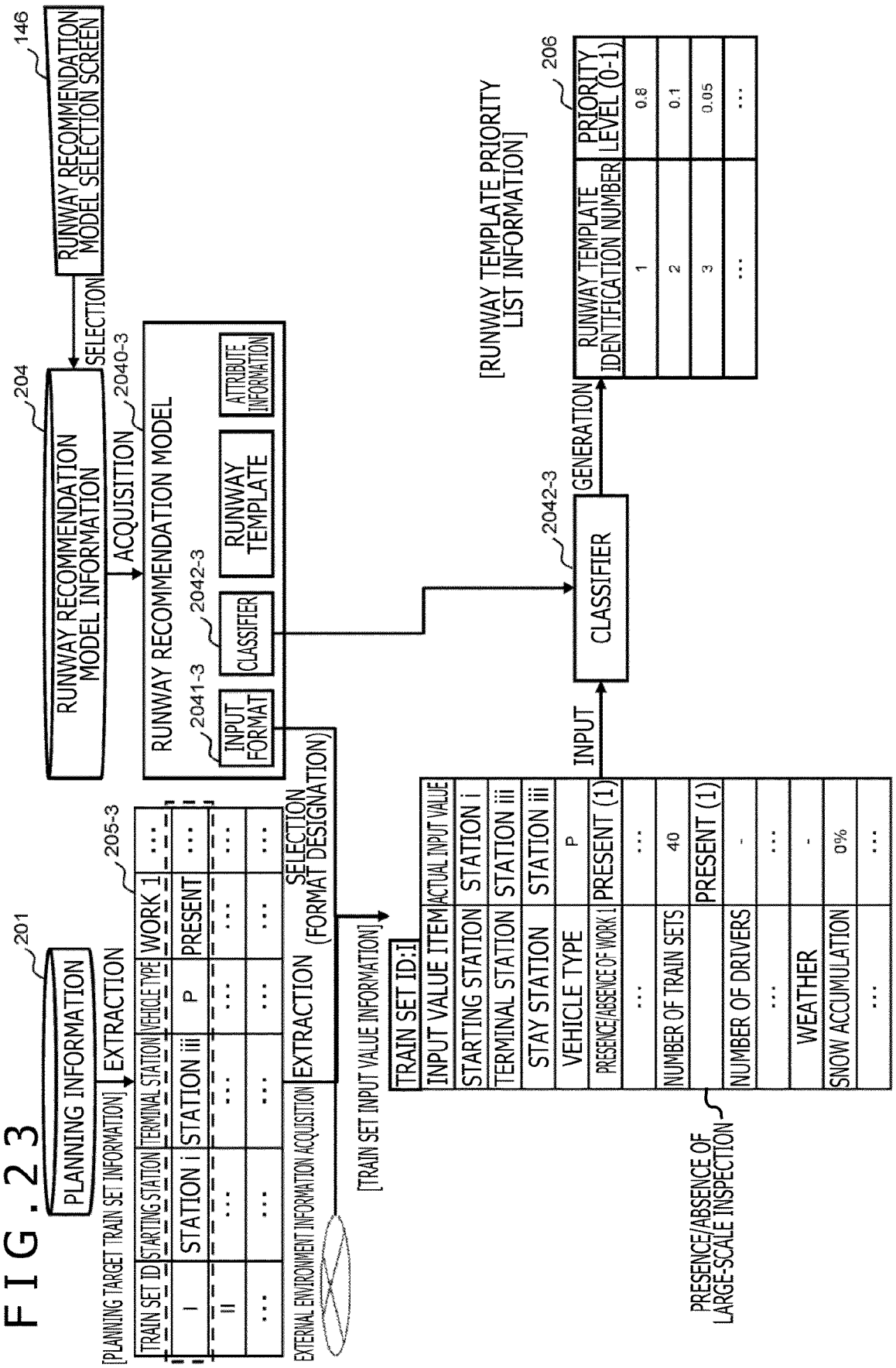

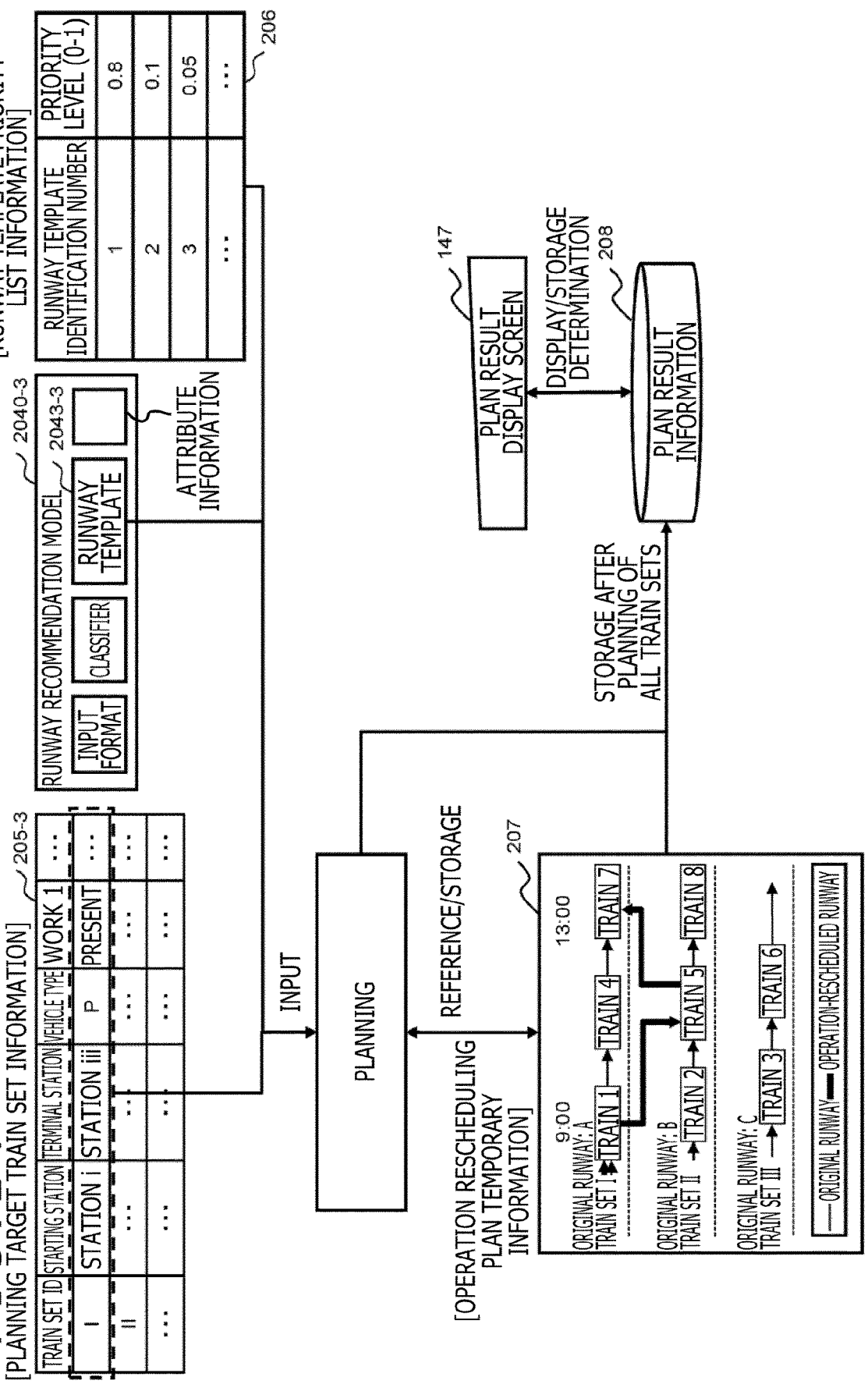

RESOURCE MANAGEMENT PLANNING SUPPORT DEVICE, RESOURCE MANAGEMENT PLANNING SUPPORT METHOD, AND PROGRAMS

TECHNICAL FIELD

The present invention relates to a resource management planning support device, a resource management planning support method, and programs. More specifically, the present invention relates to a technology that is able to provide support for the creation of a high-quality resource management plan by generating a list of planning patterns and recommended models of the planning patterns from actual result values of resource management plans and sequentially acquiring planning patterns suitable for current input values from the recommended models at the time of planning.

BACKGROUND ART

For example, in the fields of transport service and manufacturing, which require a plurality of resources such as a large number of transport machines and various devices, not only daily operation plans regarding such transport machines but also operation plans regarding various resources for maintaining the quality and safety of services and products are created and managed.

For example, in the field of railway operation, not only daily train operation plans but also maintenance plans for periodic inspection of train sets and yard shunting plans regarding train set movement in a railway depot are created. If a disruption to train operation occurs in a situation where a plurality of such plans exist, what is called "Traffic rescheduling" and what is called "Operation rescheduling" are performed. The traffic rescheduling is performed by promptly changing the train operation plans in order to restore a train schedule to normal. The operation rescheduling is performed by changing individual train sets according to the changed train operation plans. The plans created as described above are referred to as operation rescheduling plans.

In the past, only experienced responsible persons having expert knowledge about restrictions specific to individual routes in service have been able to create the operation rescheduling plans and verify the validity of the operation rescheduling plans. However, the number of such experienced responsible persons tends to decrease. If the operation rescheduling plans are not properly created, there is no alternative but to reduce the number of trains in service. This may cause a serious problem in the maintenance of transport capacity. Under the above-described circumstances, there is an increasing demand for automatic creation of operation rescheduling plans.

In a case where an operation rescheduling plan is to be automatically created, for example, the following problems need to be solved. First, a problem in operation rescheduling planning relates to sufficient assignment of train sets to individual trains according to a changed train operation plan in order to decide individual train set use plans (duties). This problem can mathematically be formulated as a set cover problem or a set partitioning problem. The class of these problems is generally proved to be a hardly calculable class (NP-hard). It is known that an optimal solution cannot be obtained within a practical length of time (first problem). Further, the restrictions to comply with, for example, a track arrangement in a station yard, the presence or absence of a track permitting a turn-back operation, and the combinations of stoppable train sets and tracks vary from one route to another. Therefore, when the operation rescheduling plan is to be automatically created, the modeling of a problem is complex, so that model development is costly (second problem). Moreover, an environmental change occurs upon each train schedule change and upon each equipment change. Therefore, plan results obtained based on a previous model are not applicable. This makes it difficult to continuously use a model once created (third problem).

As a conventional technology capable of solving some of the above-described problems, an automatic proposal method for a yard work plan is disclosed, for example, in Patent Document 1. The disclosed automatic proposal method relates to yard work plans for a railway depot that have problems similar to those of operation rescheduling plans, provides both versatility and performance scalability, and places emphasis on practicality. Meanwhile, disclosed in Patent Document 2 is a work plan support method that provides support to make it easier to register business templates than the method disclosed in Patent Document 1. More specifically, the method disclosed in Patent Document 1 prepares business templates for individual train sets in order to indicate work processes selectable by the train sets and candidates for temporal restrictions, and creates a yard work plan by integrating the individual business templates into a single plan. Further, the method disclosed in Patent Document 1 intends to provide versatility by properly dealing with differences in restrictions dependent on a target railway depot simply by changing the business templates. Meanwhile, the method disclosed in Patent Document 2 compares the duties derived from individual plan results with existing business templates, and provides support for a manual user update of business templates by presenting a user with the difference found by the comparison.

PRIOR ART DOCUMENT

Patent Documents

Patent Document 1: JP-2007-196880-A
Patent Document 2: JP-2008-221918-A
Patent Document 3: JP-2005-178742-A

SUMMARY OF THE INVENTION

Problems to be Solved by the Invention

Incidentally, the methods disclosed in Patent Documents 1 and 2 are capable of solving the above-mentioned first problem because they are able to successively update a PERT (Project Evaluation and Review Technique) network based on the use of business templates and thus create a realistic plan without sacrificing feasibility. However, it is difficult for the methods disclosed in Patent Documents 1 and 2 to solve the above-mentioned second and third problems.

More specifically, when the method disclosed in Patent Document 1 is used, the business templates need to be prepared in advance. Therefore, it is difficult to achieve modeling for automatic creation of a yard work plan. Further, model development may become costly (second problem). Moreover, since the business templates need to be updated as appropriate, it is difficult to continuously use a model once created (third problem).

Meanwhile, when the method disclosed in Patent Document 2 is used, extracted business templates need to be registered manually, so that model development is costly (second problem). Further, when the business templates are to be updated, the difference between individual plans need to be confirmed manually. Since such an update requires time and effort, a model once created cannot be continuously used (third problem). Moreover, there arises a problem where the accuracy of business template registration and update depends on the shunting skill of responsible persons.

The present invention has been made in view of the above circumstances. An object of the present invention is to provide a resource management planning support device, a resource management planning support method, and programs that are able to automatically generate models recommending train set duties, automatically select a duty suitable for a target train set, and create an operation rescheduling plan.

Means for Solving the Problems

In order to solve the above-described problems, according to an aspect of the present invention, there is provided a resource management planning support device that creates an operation rescheduling plan for a target train set group. The resource management planning support device includes a learning information storage section, a duty recommendation processing section, a planning processing section, and a screen processing section. The learning information storage section stores plan result information regarding existing operation rescheduling plans. The duty recommendation processing section exercises a prior learning function to generate a duty recommendation model for recommending a duty. The planning processing section exercises a planning function to create an operation rescheduling plan by selecting a duty template suitable for a planning target train set according to the duty recommendation model generated by the duty recommendation processing section. The screen processing section outputs a plan result display screen for displaying the operation rescheduling plan created by the planning processing section. Further, the duty recommendation processing section includes a duty learning dataset generation section and a duty recommendation model generation section. Based on the plan result information stored in the learning information storage section, the duty learning dataset generation section generates, for each of input formats designated by a user, a duty learning dataset including the input format and the duty template. The duty recommendation model generation section generates the duty recommendation model including a classifier. The classifier learns the duty template based on the input format from the duty learning dataset. The planning processing section includes a template priority list creation section and an operation rescheduling planning section. The template priority list creation section generates, for each of the planning target train sets, a train set input value based on the input format of the duty recommendation model from information regarding the corresponding planning target train sets, inputs the generated train set input value to the classifier included in the duty recommendation model, and creates a template priority list of priority levels of the individual duty templates, the priority levels being obtained as output from the classifier. Based on the template priority list created for each of the train sets, the operation rescheduling planning section preferentially selects the duty template having a high priority level indicated in the template priority list, creates a plan for each of the train sets, and creates the operation rescheduling plan for all the planning target train sets.

Further, in order to solve the above-described problems, according to another aspect of the present invention, there is provided a resource management planning support method for creating an operation rescheduling plan for a target train set group. The resource management planning support method includes a learning information storage step, a duty recommendation processing step, a planning processing step, and a plan result display step. The learning information storage step is performed to store plan result information regarding existing operation rescheduling plans. The duty recommendation processing step is performed to exercise a prior learning function to generate a duty recommendation model for recommending a duty. The planning processing step is performed to exercise a planning function to create an operation rescheduling plan by selecting a duty template suitable for a planning target train set according to the duty recommendation model generated in the duty recommendation processing step. The plan result display step is performed to display the operation rescheduling plan created in the planning processing step. Further, the duty recommendation processing step includes a duty learning dataset generation step and a duty recommendation model generation step. The duty learning dataset generation step is performed to generate, for each of input formats designated by a user, a duty learning dataset including the input format and the duty template, based on the plan result information stored in the learning information storage step. The duty recommendation model generation step is performed to generate the duty recommendation model including a classifier. The classifier learns the duty template based on the input format from the duty learning dataset generated in the duty learning dataset generation step. The planning processing step includes a template priority list creation step and an operation rescheduling planning step. The template priority list creation step is performed to generate, for each of the planning target train sets, a train set input value based on the input format of the duty recommendation model from information regarding the corresponding planning target train sets, input the generated train set input value to the classifier included in the duty recommendation model, and create a template priority list of priority levels of the individual duty templates, the priority levels being obtained as output from the classifier. The operation rescheduling planning step is performed to preferentially select, based on the template priority list created for each of the train sets, the duty template having a high priority level indicated in the template priority list, create a plan for each of the train sets, and create the operation rescheduling plan for all the planning target train sets.

Moreover, in order to solve the above-described problems, according to still another aspect of the present invention, there are provided programs for creating an operation rescheduling plan for a target train set group. The programs cause a computer to execute a learning information storage step, a duty recommendation processing step, a planning processing step, and a plan result display step. The learning information storage step is performed to store plan result information regarding existing operation rescheduling plans. The duty recommendation processing step is performed to exercise a prior learning function to generate a duty recommendation model for recommending a duty. The planning processing step is performed to exercise a planning function to create an operation rescheduling plan by selecting a duty template suitable for a planning target train set according to the duty recommendation model generated in the duty recommendation processing step. The plan result display step is performed to display the operation rescheduling plan created in the planning processing step. Further, the program for executing the duty recommendation processing step includes a duty learning dataset generation process and a duty recommendation model generation process. The duty learning dataset generation process is performed to generate, for each of input formats designated by a user, a duty learning dataset including the input format and the duty template, based on the plan result information stored in the learning information storage step. The duty recommendation model generation process is performed to generate the duty recommendation model including a classifier. The classifier learns the duty template based on the input format from the generated duty learning dataset. The program for executing the planning processing step includes a template priority list creation process and an operation rescheduling planning process. The template priority list creation process is performed to generate, for each of the planning target train sets, a train set input value based on the input format of the duty recommendation model from information regarding the corresponding planning target train set, input the generated train set input value to the classifier included in the duty recommendation model, and create a template priority list of priority levels of the individual duty templates, the priority levels being obtained as output from the classifier. The operation rescheduling planning process is performed to preferentially select, based on the template priority list created for each of the train sets, the duty template having a high priority level indicated in the template priority list, create a plan for each of the train sets, and create the operation rescheduling plan for all the planning target train sets.

Advantages of the Invention

The present invention is able to automatically generate models recommending train set duties, automatically select a duty template suitable for a target train set, and create an operation rescheduling plan.

BRIEF DESCRIPTION OF THE DRAWINGS

FIG. 2 is a diagram illustrating an example of planning information.

FIG. 3 is a diagram illustrating an example of learning plan result information.

FIG. 4 is a diagram illustrating an example of duty learning dataset information.

FIG. 5 is a diagram illustrating an example of duty recommendation model information.

FIG. 6 is a diagram illustrating an example of planning target train set information.

FIG. 7 is a diagram illustrating an example of duty template priority list information.

FIG. 13 depicts an example of an input format selection screen.

FIG. 14 depicts an example of a recommendation model attribute information correction screen.

FIG. 16 is a diagram illustrating a duty template generation method.

FIG. 20 depicts an example of a planning information selection screen.

FIG. 21 depicts an example of a duty recommendation model selection screen.

FIG. 23 is a diagram illustrating a method of generating the duty template priority list information.

FIG. 24 is a diagram illustrating a method of generating plan result information.

MODE FOR CARRYING OUT THE INVENTION

An embodiment of the present invention will now be described in detail with reference to the accompanying drawings.

(1) CONFIGURATION

Figure 1:
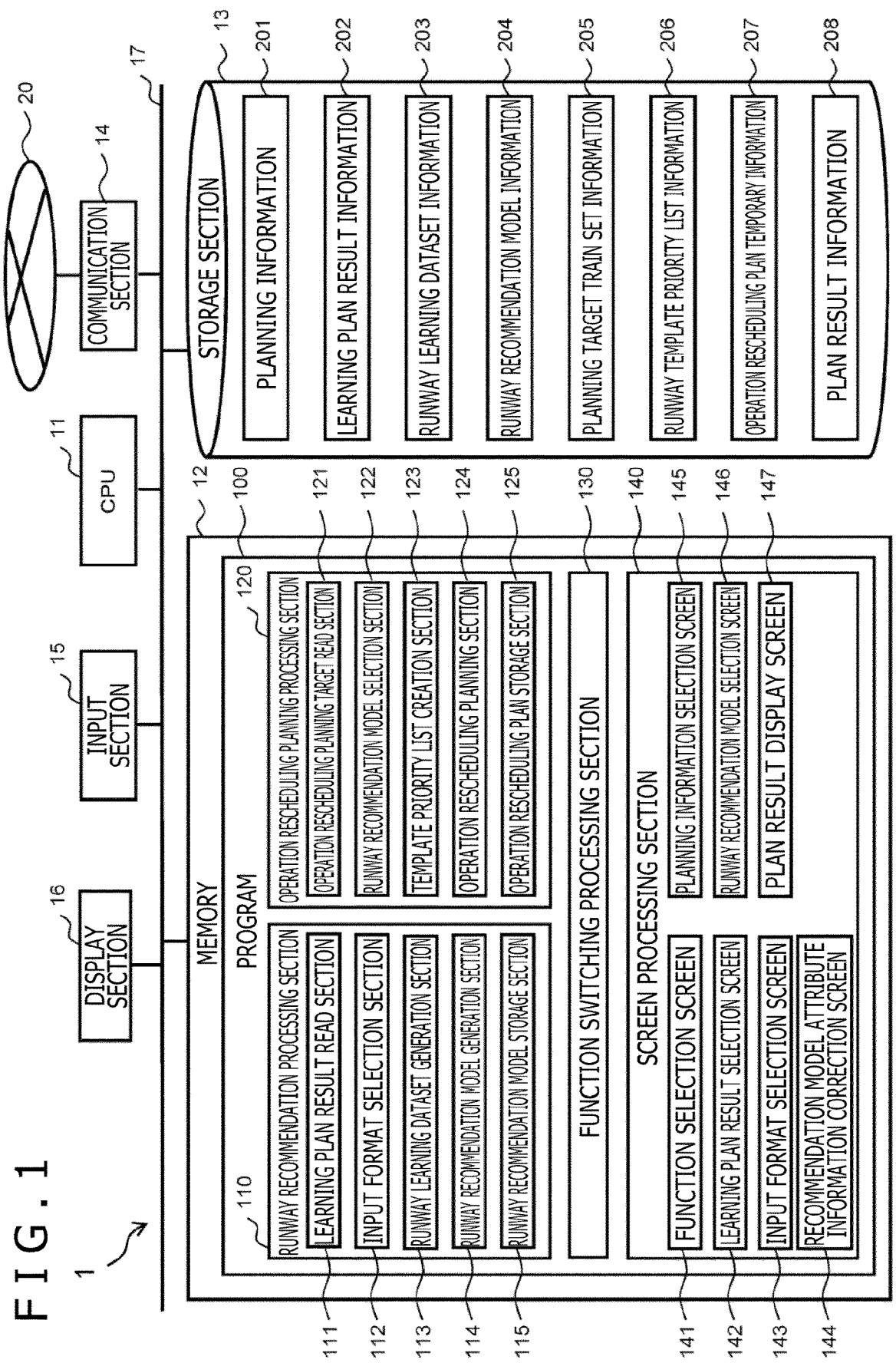
FIG. 1 is a block diagram illustrating an example configuration of a resource management planning support device according to an embodiment of the present invention.

FIG. 1 is a block diagram illustrating an example configuration of a resource management planning support device according to an embodiment of the present invention. As depicted in FIG. 1, the resource management planning support device 1 according to the present embodiment is a computer system including, for example, a CPU (Central Processing Unit) 11, a memory 12, a storage section 13, a communication section 14, an input section 15, and a display section 16. These components are connected to each other with a communication line 17.

The CPU 11 is an example of a processing device that executes various programs 100 stored in the memory 12, which is a main storage of the resource management planning support device 1. Various functions are implemented by allowing the CPU 11 to execute the various programs 100 stored in the memory 12.

FIG. 1 depicts various functional sections of the resource management planning support device 1, that is, a duty recommendation processing section 110, an operation rescheduling planning processing section 120, a function switching processing section 130, and a screen processing section 140.

The duty recommendation processing section 110 has a prior learning function for performing a "Duty recommendation process." The duty recommendation process is performed to generate a model recommending a duty based on an input format (duty recommendation model). In order to implement more detailed functions, the duty recommendation processing section 110 includes various functional sections, that is, a learning plan result read section 111, an input format selection section 112, a duty learning dataset generation section 113, a duty recommendation model generation section 114, and a duty recommendation model storage section 115. Details of the individual functional sections will be clarified by a subsequent detailed description of processing.

The operation rescheduling planning processing section 120 has a planning function for performing a "Planning process." The planning process is performed to create an operation rescheduling plan by automatically selecting a duty template suitable for a target train set according to the duty recommendation model. In order to implement more detailed functions, the operation rescheduling planning processing section 120 includes various functional sections, that is, an operation rescheduling planning target read section 121, a duty recommendation model selection section 122, a template priority list creation section 123, an operation rescheduling planning section 124, and an operation rescheduling plan storage section 125. Details of the individual functional sections will be clarified by a subsequent detailed description of processing.

The function switching processing section 130 has a function for switching between the above-mentioned prior learning function and planning function.

The screen processing section 140 has a function for generating various screens to be outputted to the display section 16, in association with the processing performed by the above-mentioned processing sections, and receiving an input operation that is performed on a screen outputted to the display section 16 through the input section 15. More specifically, the various screens generated by the screen processing section 140 are a function selection screen 141, a learning plan result selection screen 142, an input format selection screen 143, a recommendation model attribute information correction screen 144, a planning information selection screen 145, a duty recommendation model selection screen 146, and a plan result display screen 147. Details of the individual screens will be clarified by a subsequent detailed description of processing.

The storage section 13 is a storage for storing various types of information, and is, for example, an auxiliary storage of the resource management planning support device 1. As depicted in FIG. 1, the information to be stored in the storage section 13 includes planning information 201, learning plan result information 202, duty learning dataset information 203, duty recommendation model information 204, planning target train set information 205, duty template priority list information 206, operation rescheduling plan temporary information 207, and plan result information 208. The individual types of information will be described in detail later. In a modification of the present embodiment, the above-mentioned types of information may alternatively be retained in an external storage area (e.g., a cloud storage system or an external database) connected through a communication network 20.

The communication section 14 is a communication interface connected to the communication network 20, and is used to communicatively connect an external device to the resource management planning support device 1 through the communication network 20.

The input section 15 is, for example, a mouse, a keyboard, or other input device that receives an input operation performed by a user. The display section 16 is a display device such as a display. As mentioned earlier, the display section 16 displays various screens generated by the screen processing section 140. When the user performs a predetermined operation on a displayed screen through the input section 15, the predetermined operation is reflected in the screen.

(2) DATASET

Various types of information to be stored in the storage section 13 will now be described in detail.

FIG. 2 is a diagram illustrating an example of the planning information. The planning information 201 is stored to make a list of train set information targeted for planning. This list is sorted by date. The train set information is registered on an individual train set basis (on an individual train set ID basis). As depicted in FIG. 2, the train set information includes information regarding, for example, a starting station, a terminal station, a vehicle type, and work.

FIG. 3 is a diagram illustrating an example of the learning plan result information. The learning plan result information 202 is obtained by compiling, for prior learning, the plan result information regarding existing operation rescheduling plans stored as the plan result information 208. Therefore, it may be regarded that the learning plan result information 202 is in the same data format as the plan result information 208.

As depicted in FIG. 3, the learning plan result information 202, which is stored by sorting the information regarding plan results by date, may include plan result information 2021, duty information 2022, and a plan evaluation value 2023. The plan result information 2021 is a graph representation of duties for individual train sets. The duty information 2022 is generated when trains assigned to individual planning target dates and train sets are extracted from the plan result information 2021. The duty information 2022 may be generated as needed from the plan result information 2021 or may be generated in advance and stored as the learning plan result information 202. Meanwhile, the plan evaluation value 2023 is used to retain an evaluation value that is obtained when an operation rescheduling plan is evaluated in terms of predetermined evaluation criteria (e.g., "Operation restriction compliance rate").

FIG. 4 is a diagram illustrating an example of the duty learning dataset information. The duty learning dataset information 203 is stored as a dataset (a duty learning dataset) that is obtained by summarizing a plurality of pieces of information regarding an operation rescheduling plan. The duty learning dataset is generated from the plan results of known (existing) operation rescheduling plans according to an input format selected by the user. A plurality of duty learning datasets for each input format are retained as the duty learning dataset information 203.

More specifically, as depicted in FIG. 4, each dataset in the duty learning dataset information 203 includes a set of four different pieces of information, that is, an input format 2031, a train set input value 2032, a duty template 2033, and a duty ground truth value 2034. The duty learning dataset information 203 is generated by the duty learning dataset generation section 113.

The input format 2031 is information indicating the combination (input format) of valid ones of a plurality of input items regarding an operation rescheduling plan. The input format 2031 is generated representing the result of user selection from the input format selection screen 143 (see FIG. 13). For example, in the case of the input format 2031 illustrated in FIG. 4, the combination of "Category" and "Input value item" is indicated to depict a selectable input format displayed on the input format selection screen 143, and the result of user selection is reflected under "State." It is required that various input format items selectable from the input format selection screen 143 be registered in advance.

The train set input value 2032 is stored to make a list of real values (raw values) of each train set according to a learning plan result read from the learning plan result information 202, regarding each input format item described as the input format 2031.

The duty template 2033 stores a list of a plurality of duty templates to which identification numbers (duty template identification numbers) are assigned. The duty templates are generated when the duty learning dataset generation section 113 uses a predetermined search key to repetitively conduct a search and an update on duties extracted from a learning plan result read from the learning plan result information 202.

The duty ground truth value 2034 retains information regarding duty templates corresponding to the plan result, on an individual train set basis. In the case of the duty ground truth value 2034 depicted in FIG. 4, whether or not the duty templates correspond to the plan result is indicated under "Correspondence." The correspondence is determined by allowing the duty learning dataset generation section 113 to compare individual duty templates retained by the duty template 2033 with the duties of individual train sets indicated by the learning plan result.

FIG. 5 is a diagram illustrating an example of the duty recommendation model information. The duty recommendation model information 204 is used to store a model recommending duties based on the input format (duty recommendation model). The duty recommendation model includes a set of a plurality of later-described pieces of information, which are generated from the duty learning dataset information 203. Therefore, the duty recommendation model information 204 retains a plurality of sets of duty recommendation models based on individual input formats.

More specifically, as depicted in FIG. 5, each duty recommendation model in the duty recommendation model information 204 includes a set of four different pieces of information, that is, an input format 2041, a classifier 2042, a duty template 2043, and attribute information 2044. The input format 2041, the classifier 2042, and the duty template 2043 are generated by the duty recommendation model generation section 114 according to the duty learning dataset information 203. The attribute information 2044 is generated based on the input from the recommendation model attribute information correction screen 144.

The input format 2041 and the duty template 2043 are the same as the input format 2031 and the duty template 2033 in the duty learning dataset information 203, which is described with reference to FIG. 4. Therefore, the input format 2041 and the duty template 2043 will not be redundantly described.

Figure 19:
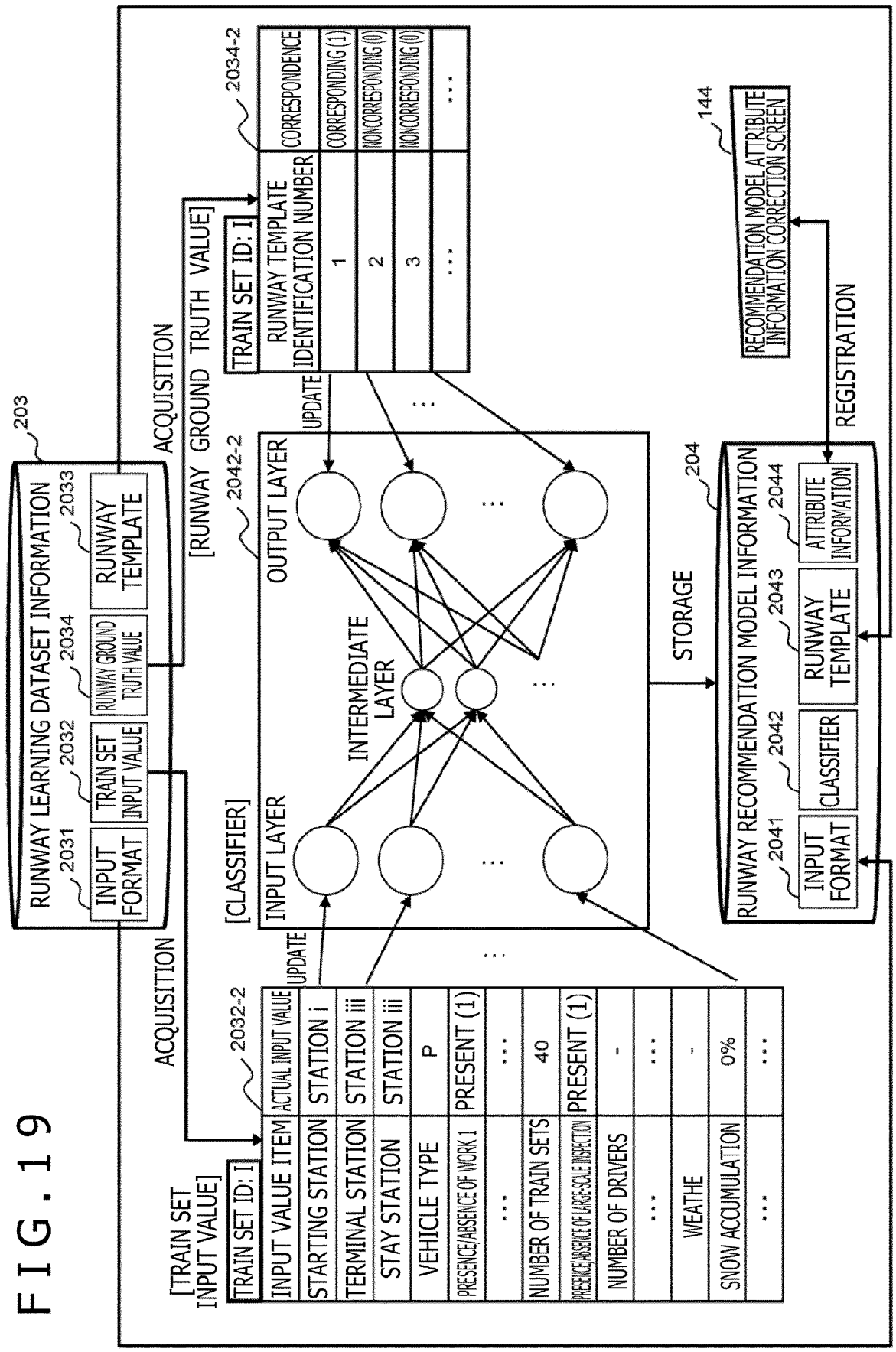
FIG. 19 is a diagram illustrating a method of generating various types of information to be included in the duty recommendation model information.

The classifier 2042 is a classifier that learns the duty template 2043 based on the input format 2031 by using the existing operation rescheduling plans (substitutable by the duty learning datasets) as learning data. In the present embodiment, the classifier 2042 is not limited to any specific type of classifier. Therefore, the classifier 2042 may use, for example, machine learning, predefined classification rules, or predetermined statistical processing. If, for instance, a graph structure and the weight of each side are stored to use a decision tree in a situation where a neural network is used for the classifier 2042, for example, a tree structure and classification rules (if-then rules) for branching into individual branches should preferably be stored. Since a format varies with the type of classifier, no specific format is designated here. In FIG. 19, which is referred to later in the present specification, an image of the classifier 2042 using a simple neural network is depicted as an example.

The attribute information 2044 retains attribute information regarding each duty recommendation model. For example, in the case depicted in FIG. 5, the attribute information 2044 retains not only the name of a duty recommendation model and its creation date and time, but also a tag attached to indicate the attribute of the duty recommendation model and a memo regarding the duty recommendation model.

FIG. 6 is a diagram illustrating an example of the planning target train set information. The planning target train set information 205 retains train set information regarding train sets targeted for operation rescheduling planning. For example, in the case depicted in FIG. 6, the planning target train set information 205 retains information regarding the target train sets, such as an ID, a starting station, a terminal station, a vehicle type, and the necessity of predetermined work. As is obvious from comparison between FIGS. 6 and 2, the planning target train set information 205 can be created by extracting relevant information from the planning information 201.

FIG. 7 is a diagram illustrating an example of the duty template priority list information. The duty template priority list information 206 is information indicating the priority level of each duty template 2033 (or duty template 2043) in operation rescheduling planning, and is generated by the template priority list creation section 123 from the output from the classifier 2042 in response to the input of the train set input value 2032. In the case depicted in FIG. 7, the priority level is indicated by a numerical value between "0" and "1." When the numerical value becomes closer to "1," the priority level becomes higher.

The operation rescheduling plan temporary information 207 is temporary information regarding an operation rescheduling plan that is stored in the middle of planning processing. The details of the operation rescheduling plan temporary information 207 are not illustrated by the drawings. Further, as described to explain about the learning plan result information 202 illustrated in FIG. 3, the plan result information 208 may be in the same data format as the learning plan result information 202. Therefore, the details of the plan result information 208 are not illustrated by the drawings.

(3) PROCESSING

Processing performed by the resource management planning support device 1 according to the present embodiment will now be described.

Figure 8:
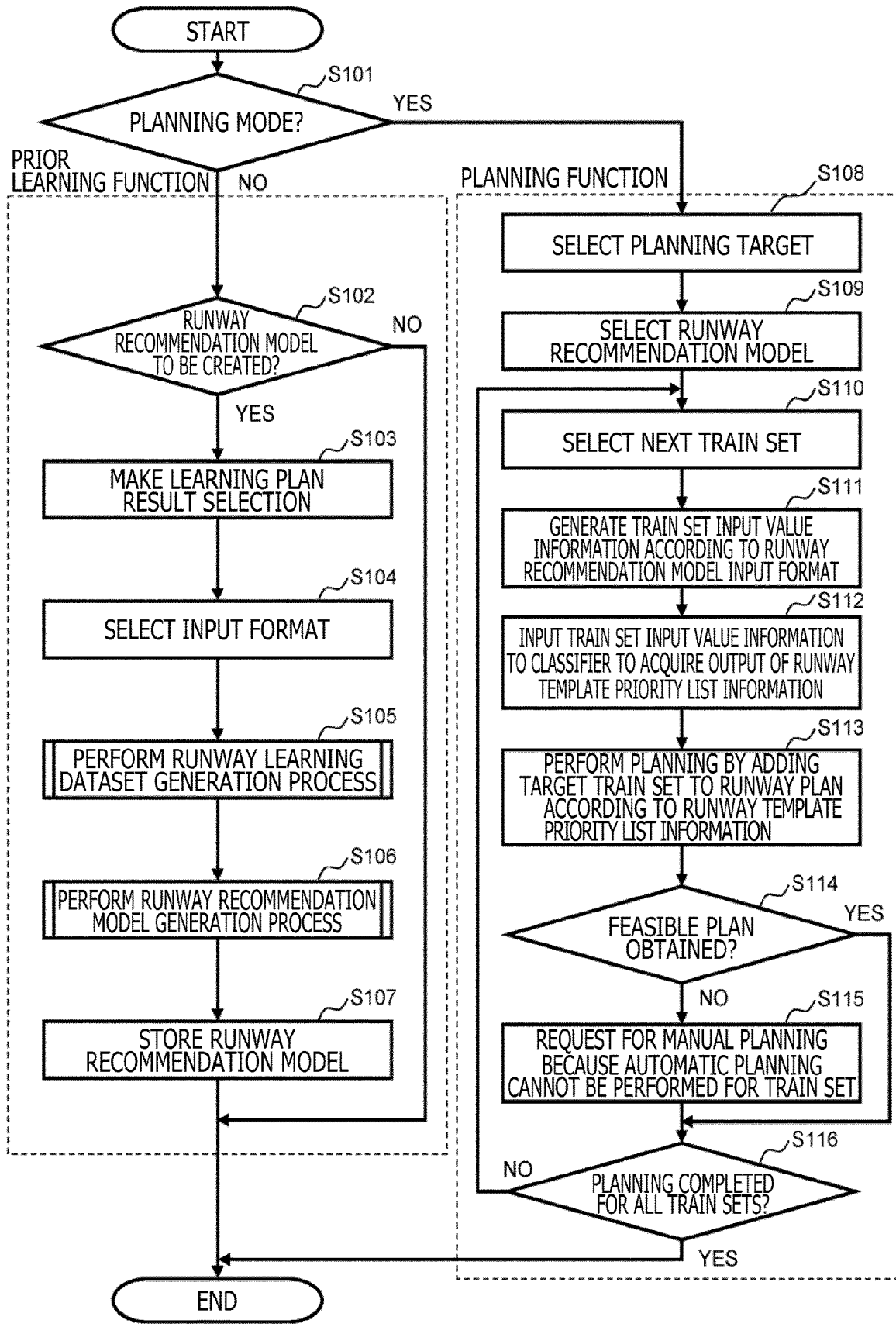
FIG. 8 is a flowchart illustrating example processing steps of an overall process in the resource management planning support device 1 depicted in FIG. 1.
Figure 9:
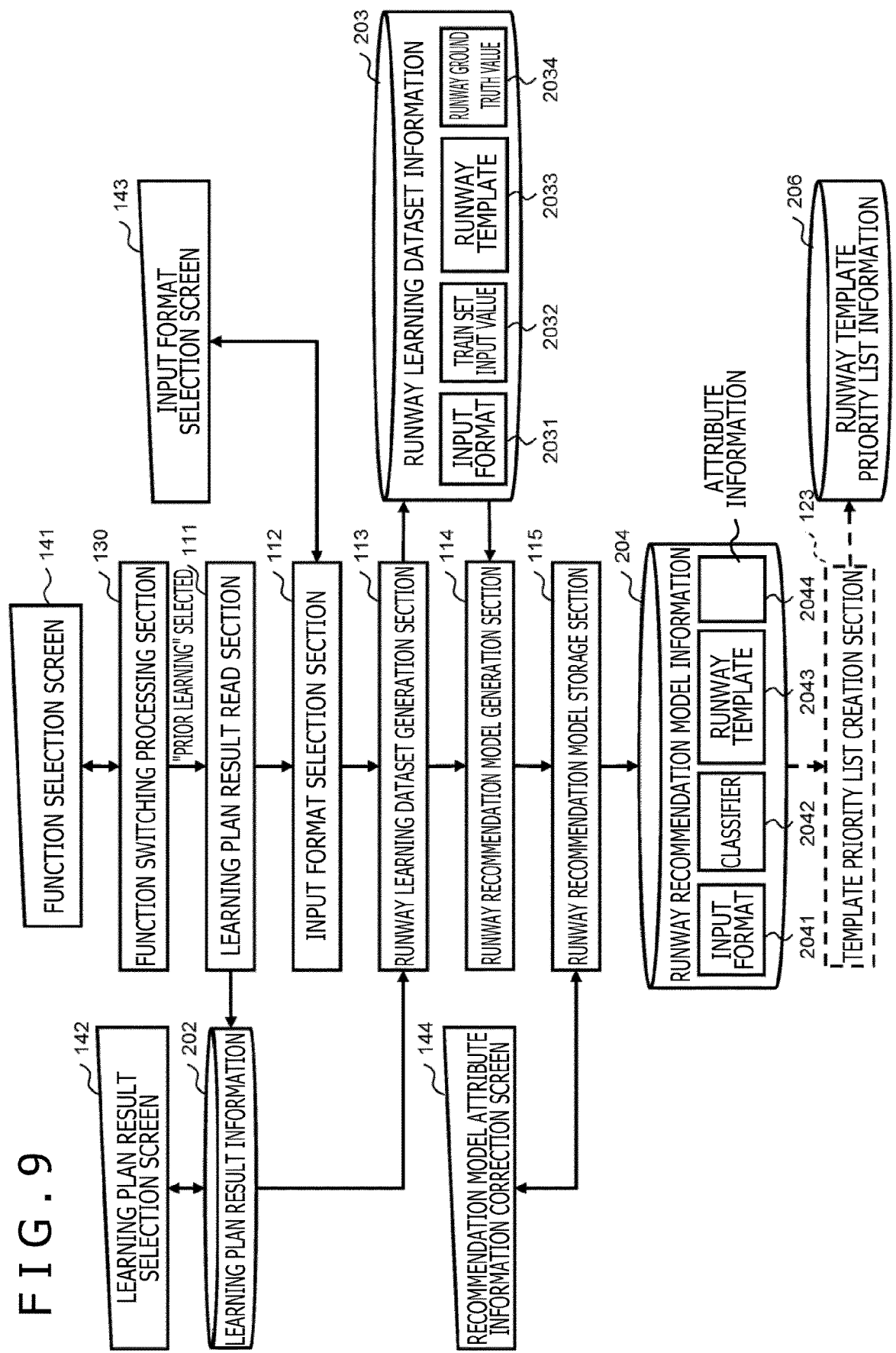
FIG. 9 is a diagram illustrating the relation between prior learning functional sections and data.
Figure 10:
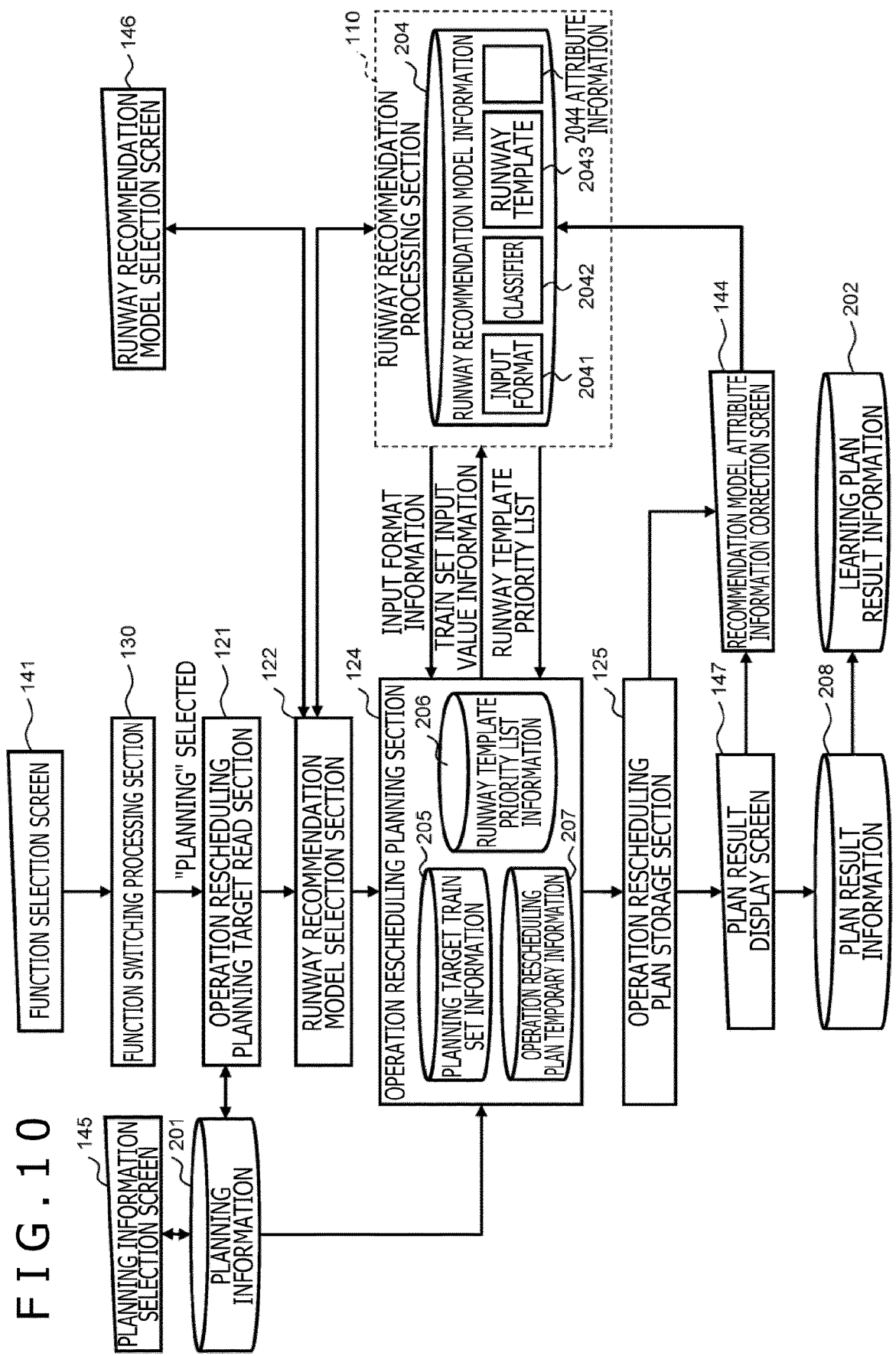
FIG. 10 is a diagram illustrating the relation between planning functional sections and data.

FIG. 8 is a flowchart illustrating example processing steps of an overall process in the resource management planning support device 1 depicted in FIG. 1. Further, FIG. 9 is a diagram illustrating the relation between prior learning functional sections and data, and FIG. 10 is a diagram illustrating the relation between planning functional sections and data.

Referring to FIG. 8, the display section 16 first displays the function selection screen 141. Then, according to a user selection from the function selection screen 141, the function switching processing section 130 determines a selected function (mode) (step S101).

Figure 11:
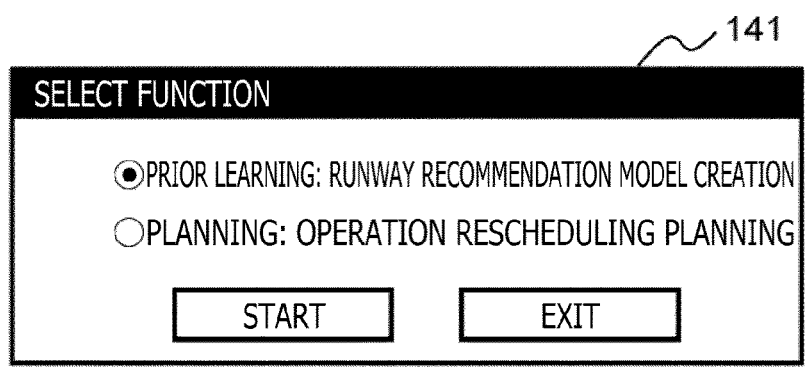
FIG. 11 depicts an example of a function selection screen.

FIG. 11 depicts an example of the function selection screen. As depicted in FIG. 11, the function selection screen 141 displays two selectable functions (modes), that is, a prior learning function (mode) for creating a duty recommendation model and a planning function (mode) for creating an operation rescheduling plan. When the user selects either of the two functions (modes) and then presses the "Start" button, the function (mode) selection is applied.

If the function selected in step S101 is not the planning mode, that is, if the prior learning mode is selected in step S101 ("NO" in step S101), processing proceeds to step S102, and mainly the duty recommendation processing section 110 performs processing by using the prior learning function (steps S102 to S107). On the other hand, if the function selected in step S101 is the planning mode ("YES" in step S101), processing proceeds to step S108, and mainly the operation rescheduling planning processing section 120 performs processing by using the planning function (steps S108 to S116).

The processing performed by the prior learning function (duty recommendation process) and the processing performed by the planning function (planning process) will now be described in detail.

(3-1) Prior Learning Function (Duty Recommendation Process)

This chapter describes the details of the prior learning function (duty recommendation process) according to the present embodiment.

In the duty recommendation process, the duty recommendation processing section 110 first determines whether or not to create a duty recommendation model (step S102 of FIG. 8). When the duty recommendation model is to be created ("YES" in step S102), processing proceeds to step S103 to practically start the duty recommendation process. On the other hand, when the duty recommendation model is not to be created ("NO" in step S102), the process terminates without performing any more specific processing steps. It should be noted that the processing performed in step S102 is a process of reconfirming whether the duty recommendation model is to be actually created, in a case where the prior learning mode is selected in step S101. Therefore, for example, a confirmation screen (not depicted) may be displayed to make a determination based on a user response to the confirmation screen. If such reconfirmation is not required, the processing in step S102 may be omitted.

When the duty recommendation process starts, the display section 16 displays the learning plan result selection screen 142. Then, according to a user selection from the learning plan result selection screen 142, the learning plan result read section 111 makes a learning plan result selection (step S103).

Figure 12:
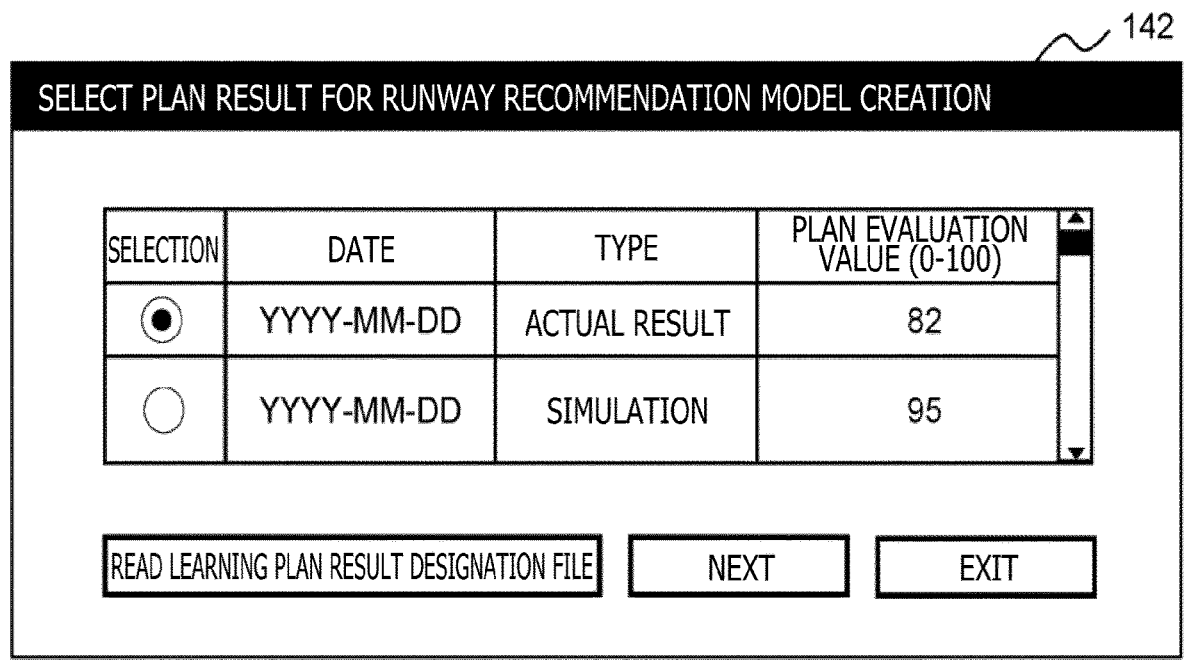
FIG. 12 depicts an example of a learning plan result selection screen.

FIG. 12 depicts an example of the learning plan result selection screen. As depicted in FIG. 12, the learning plan result selection screen 142 displays information regarding a plurality of existing plan results stored as the learning plan result information 202. When the user selects one or more desired plan results from the plurality of displayed plan results and presses the "Read learning plan result designation file" button, the learning plan result selection is applied. It should be noted that, as described later to explain about the planning process, existing plan result information stored as the plan result information 208 in a previously performed planning process is stored as the learning plan result information 202. Further, as "Type" is indicated in FIG. 12, the learning plan result information 202 (as well as the plan result information 208) is able to store not only actual plan results, which can be referred to as the collective intelligence based on accumulated knowhow, but also the plan results obtained by simulation of the resource management planning support device 1. Therefore, the learning plan result selection may be made from such a variety of plan results. Subsequently, the learning plan result read section 111 makes the learning plan result selection by accessing the learning plan result information 202 and reading the plan results selected from the learning plan result selection screen 142.

It should be noted that, as illustrated in FIG. 12, the learning plan result selection screen 142 is able to display not only "Date" indicative of the creation date and time of a plan result to be selected, but also information serving as the criteria for selection by the user, such as "Type" and "Plan evaluation value." This will assist the user in making a decision and provide support for making a more appropriate selection.

Next, the display section 16 displays the input format selection screen 143. Then, according to a user selection from the input format selection screen 143, the input format selection section 112 selects an input format (step S104).

FIG. 13 depicts an example of the input format selection screen. As depicted in FIG. 13, the input format selection screen 143 displays a selectable input format for use in duty recommendation model creation. When the user selects a desired input format and presses the "Read input format designation file" button, the input format selection is applied. It should be note that, in the case depicted in FIG. 13, the selectable input format items are divided into an "Individual train set" category concerning an individual train set, an "Overall plan" category concerning an overall operation rescheduling plan, and an "External environment" category concerning a category other than the above categories. The external environment category may include, for example, external causes such as weather and snow accumulation. When such external information is selected, open data such as weather information should preferably be acquired from the outside through a network (communication network 20) (refer also to FIG. 17, which will be referred to later). The resource management planning support device 1 according to the present embodiment makes it possible to select such an external environment as an input format, and is thus able to create more accurate operation rescheduling plans.

After an input format is selected in step S104, the duty learning dataset generation section 113 generates an operation rescheduling plan dataset (duty learning dataset information 203) according to the learning plan result selected in step S103 and the input format selected in step S104 (step S105). Processing performed in step S105 is referred to as a duty learning dataset generation process, and will be described in detail later with reference to FIGS. 15 to 17.

Next, according to the duty learning dataset information 203 generated in step S105, the duty recommendation model generation section 114 generates a duty recommendation model (step S106). Processing performed in step S106 is referred to as a duty recommendation model generation process, and will be described in detail later with reference to FIGS. 18 and 19.

Finally, the display section 16 displays the recommendation model attribute information correction screen 144 regarding the duty recommendation model generated in step S106, and prompts for input of attribute information regarding the duty recommendation model. Then, in a case where a user operation is performed on the recommendation model attribute information correction screen 144 to prompt for storage after the input of the attribute information, the duty recommendation model storage section 115 stores, as the duty recommendation model information 204, the duty recommendation model to which the attribute information is added (step S107). Upon completion of step S107, the duty recommendation process terminates.

FIG. 14 depicts an example of the recommendation model attribute information correction screen. As depicted in FIG. 14, the recommendation model attribute information correction screen 144 is displayed so that the user is allowed to add or correct various types of attribute information (refer also to the attribute information 2044 in FIG. 5) with respect to the duty recommendation model generated by the duty recommendation model generation section 114. When the user adds or corrects the attribute information regarding the duty recommendation model from the recommendation model attribute information correction screen 144 and then presses the "Save and exit" button, the contents of the saved attribute information are applied. In response to such an applying operation, the duty recommendation model storage section 115 stores the applied contents of the duty recommendation model as the duty recommendation model information 204.

FIG. 9 relates to the above-described duty recommendation process performed in steps S102 to S107 of FIG. 8, and illustrates the relation between the related functional sections and data in an easy-to-understand manner. It should be noted that FIG. 9 marks the template priority list creation section 123 with a broken line, and it signifies that the processing performed by the template priority list creation section 123 to create the duty template priority list information 206 is executed by the planning function (planning process) and not by the prior learning function (duty recommendation process).

More specifically, the template priority list creation section 123 has a function for creating, at the time of planning processing, a duty template list indicative of priority levels (duty template priority list information 206) according to a train set input value based on an input format by using the duty recommendation model information 204 generated in the duty recommendation process. That is, although the timing at which the template priority list creation section 123 creates the above-mentioned list is the time of planning processing, FIG. 10, which illustrates the planning function (planning process), does not depict the template priority list creation section 123 due to illustration limitations.

(3-1-1) Duty Learning Dataset Generation Process

Figure 15:
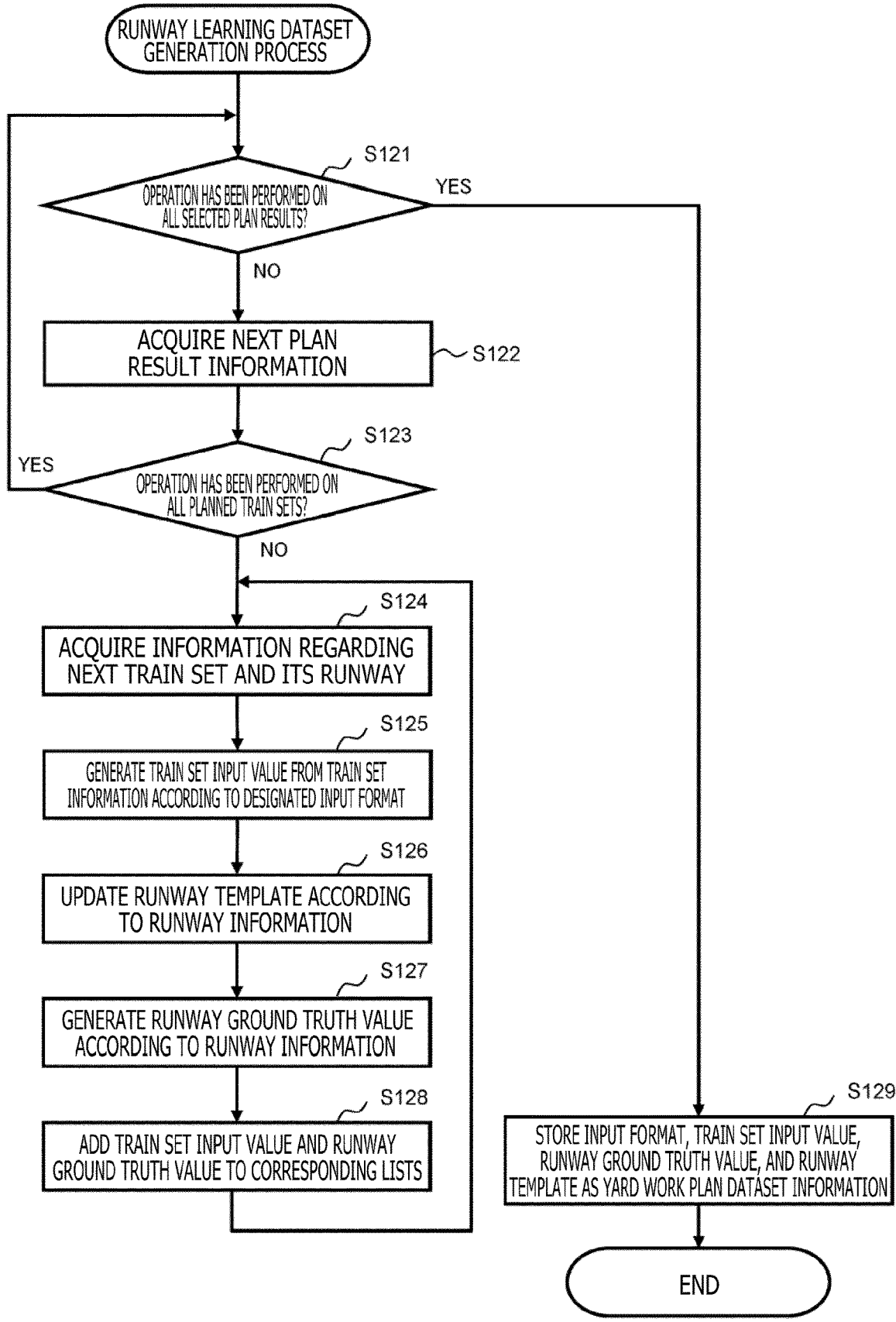
FIG. 15 is a flowchart illustrating example processing steps of a duty learning dataset generation process.

FIG. 15 is a flowchart illustrating example processing steps of the duty learning dataset generation process. As mentioned earlier, the duty learning dataset generation process is the processing performed in step S105 of FIG. 8. In this process, the duty learning dataset generation section 113 generates a duty learning dataset by summarizing the information regarding an operation rescheduling plan.

Referring to FIG. 15, the duty learning dataset generation section 113 first determines whether or not an operation (processing) indicated in later-described steps S124 to S128 has been performed on all learning plan results selected in step S103 of FIG. 8 (step S121). In a case where there is any learning plan result on which the above operation has not been performed or when the operation is performed for the first time, processing proceeds to step S122 to acquire plan result information (learning plan result information 202) corresponding to the learning plan result on which the operation has not been performed, and then processing proceeds to step S123. On the other hand, in a case where the above operation has been completely performed on all the selected learning plan results, processing proceeds to step S129.

In step S123, the duty learning dataset generation section 113 determines whether or not the operation (processing) indicated in later-described steps S124 to S128 has been performed on all train sets included in the plan result information acquired in step S122. In a case where there is any train set on which the operation has not been performed, processing proceeds to step S124. On the other hand, in a case where the above operation has been completely performed on all the train sets, processing returns to step S121.

In step S124, the duty learning dataset generation section 113 acquires the train set information regarding the next train set and the duty of the next train set.

Next, according to the input format selected (designated) from the input format selection screen 143 in step S104 of FIG. 8, the duty learning dataset generation section 113 generates a train set input value from the train set information acquired in step S124 (step S125). It should be noted that the above selected (designated) input format is added to the list of the input format 2031.

Next, the duty learning dataset generation section 113 updates the duty template 2033 according to the duty acquired in step S124 (step S126).

Next, the duty learning dataset generation section 113 generates a duty ground truth value according to the duty acquired in step S124 (step S127).

Next, the duty learning dataset generation section 113 adds the train set input value generated in step S125 and the duty ground truth value generated in step S127, to corresponding lists (train set input value 2032 and duty ground truth value 2034) (step S128).

Then, in step S129, the duty learning dataset generation section 113 stores various types of information added or updated in the preceding steps of the duty learning dataset generation process (more specifically the input format 2031 added in step S125, the duty template 2033 updated in step S126, and the train set input value 2032 and duty ground truth value 2034 added in step S128) in the storage section 13 as the duty learning dataset information 203. Upon completion of step S129, the generation of the operation rescheduling plan dataset terminates.

Figure 17:
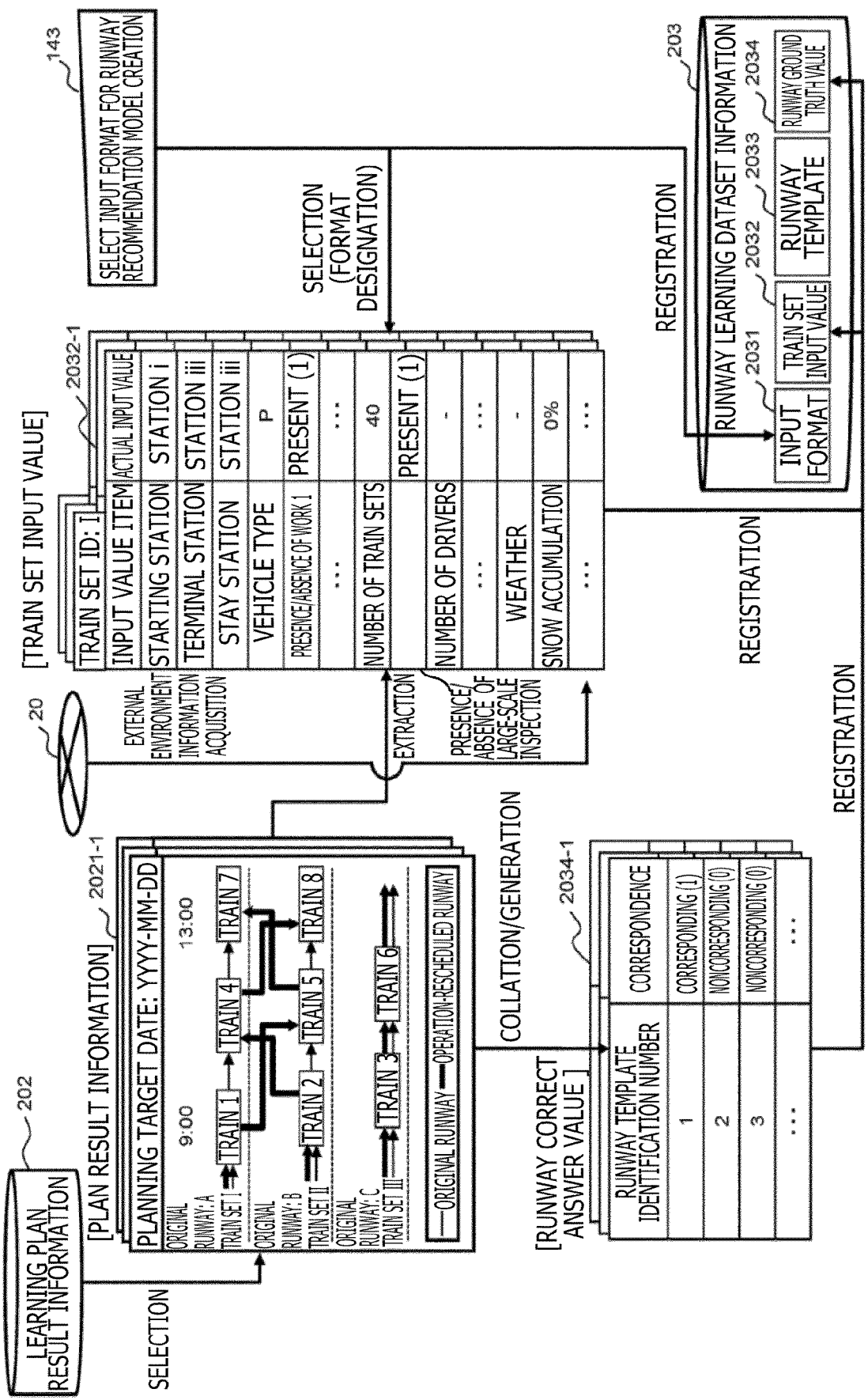
FIG. 17 is a diagram illustrating a method of generating an input format, a train set input value, and a duty ground truth value.

FIGS. 16 and 17 depict concrete examples of steps of the above-described duty learning dataset generation process that is performed to generate (add and update) various types of information included in the duty learning dataset information 203.

FIG. 16 is a diagram illustrating a duty template generation method.

As depicted in FIG. 16, a learning plan result (plan result information 2021-1) is first acquired from the learning plan result information 202 according to the selection made in step S103 of FIG. 8, and then, duty information 2022-1 is extracted for a selected train set (train set I in the present example) (step S124).

Next, the duty learning dataset generation section 113 searches existing duty templates 2033-1 read from the duty learning dataset information 203, by using a predetermined search key (a sequence of "Order," "Original duty ID," "In-duty order," "Arrival station," "Train route type," and "Train type" in the present example) included in the extracted duty information 2022-1.

Subsequently, in a case where a duty template is found to match the search key used in the above search, the duty learning dataset generation section 113 does not perform a duty template update.

On the other hand, in a case where no duty template is found to match the search key used in the search of the existing duty templates 2033-1, the duty learning dataset generation section 113 creates and adds a new duty template according to the above-mentioned extracted duty information 2022-1 (step S126).

Finally, the duty learning dataset generation section 113 is able to update the duty template 2033 stored in the duty learning dataset information 203, by registering the above update and newly created duty template information, which is applied to the duty templates 2033-1, as the duty learning dataset information 203 (step S129).

FIG. 17 is a diagram illustrating a method of generating the input format, the train set input value, and the duty ground truth value.

As depicted in FIG. 17, a learning plan result (plan result information 2021-1) is first acquired from the learning plan result information 202 according to the selection made in step S103 of FIG. 8. Further, although not depicted in FIG. 17, the train set information and duty regarding the selected train set (train set I in the present example) is extracted from the plan result information 2021-1 (step S124).

Next, according to the input format selected (designated) from the input format selection screen 143 in step S104 of FIG. 8, the duty learning dataset generation section 113 generates a train set input value 2032-1 from the train set information extracted in step S124 (step S125). It should be noted that, in a case where an item in the "External environment" category (refer to FIG. 13) is selected from the input format selection screen 143, the duty learning dataset generation section 113 acquires desired external environment information through the communication network 20, as depicted as "External environment information acquisition" in FIG. 17, and uses the acquired external environment information to generate the train set input value 2032-1.

Further, the duty learning dataset generation section 113 checks for correspondence by collating the duty information regarding each train set extracted in step S124 (similar to the duty information 2022-1 in FIG. 16) with the duty templates (duty templates 2033-1 in FIG. 16) updated in step S126. Then, the duty learning dataset generation section 113 generates a duty ground truth value 2034-1 indicative of the relation between the identification number of each duty template and the correspondence (corresponding/noncorresponding) (step S127).

Subsequently, the duty learning dataset generation section 113 is able to generate the input format 2031, the train set input value 2032, and the duty ground truth value 2034 by adding the train set input value 2032-1 generated in step S125 and the duty ground truth value 2034-1 generated in step S127 to corresponding lists (step S128) and registering such additions to the lists and the input format selected (designated) from the input format selection screen 143 as the duty learning dataset information 203 (step S129).

(3-1-2) Duty Recommendation Model Generation Process

Figure 18:
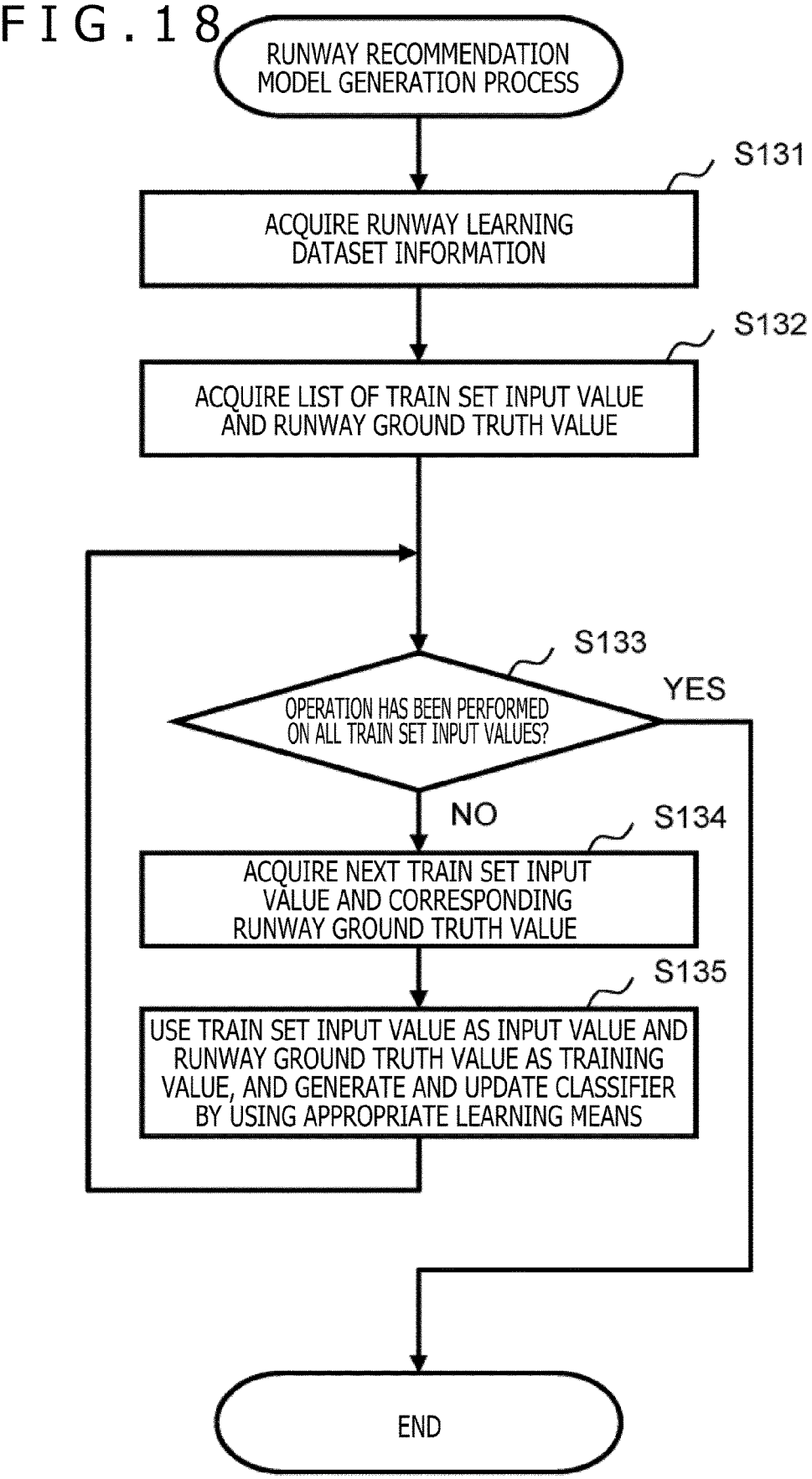
FIG. 18 is a flowchart illustrating example processing steps of a duty recommendation model generation process.

FIG. 18 is a flowchart illustrating example processing steps of the duty recommendation model generation process. As mentioned earlier, the duty recommendation model generation process is performed in step S106 of FIG. 8 by the duty recommendation model generation section 114 in order to achieve duty recommendation model generation.

Referring to FIG. 18, the duty recommendation model generation section 114 first acquires the duty learning dataset information 203 stored in the storage section 13 (step S131).

Next, the duty recommendation model generation section 114 acquires a list of the train set input value 2032 and duty ground truth value 2034 from the duty learning dataset information 203 acquired in step S131 (step S132).

Next, the duty recommendation model generation section 114 determines whether or not the operation (processing) indicated in later-described steps S134 and S135 has been performed on all train set input values included in the list acquired in step S132 (step S133). In a case where there is any train set input value on which the operation has not been performed, processing proceeds to step S134. On the other hand, in a case where the above operation has been completely performed on all the train set input values, the duty recommendation model generation process terminates.

In step S134, the duty recommendation model generation section 114 acquires the next train set input value and the duty ground truth value corresponding to the next train set input value, from the list of the train set input value 2032, which is acquired in step S132.

Next, the duty recommendation model generation section 114 uses the train set input value acquired in step S134 as an input value and the duty ground truth value acquired in step S134 as a training value, generates a classifier by using appropriate learning means, and uses the generated classifier as a classifier of the duty recommendation model (step S135). It should be noted that, in step S135, the duty recommendation model generation section 114 uses, as the input format and duty template for the above-mentioned duty recommendation model, the input format 2031 and duty template 2033 stored together with the train set input value and duty ground truth value used for generating the above-mentioned classifier of the duty learning dataset information 203. It should also be noted that the attribute information regarding the above-mentioned duty recommendation model is to be added later by the user from the recommendation model attribute information correction screen 144.

Upon completion of step S135, processing returns to step S133. In step S133, as described earlier, the duty recommendation model generation section 114 determines whether or not the operation (processing) is completely performed on all the train set input values. Therefore, the duty recommendation model generation section 114 repetitively performs the processing in steps S134 and S135 on each train set input value before the query in step S133 is answered "YES" and the duty recommendation model generation process is terminated. Consequently, the input format, classifier, and duty template for the duty recommendation model can be generated with respect to each train set input value included in the list of the train set input value 2032, which is acquired in step S132 (i.e., with respect to each operation rescheduling plan stored together as the duty learning dataset information 203).

FIG. 19 depicts a concrete example of the steps that are performed in the above-mentioned duty recommendation model generation process and a subsequent storage process (step S107 of FIG. 8) in order to register various types of information to be included in the duty recommendation model information 204.

FIG. 19 is a diagram illustrating a method of generating various types of information to be included in the duty recommendation model information. It should be noted that the method illustrated in FIG. 19 uses a simple neural network as the classifier.

As depicted in FIG. 19, the duty recommendation model generation section 114 first acquires a pair of train set input value and duty ground truth value (train set input value 2032-2 and duty ground truth value 2034-2) from the duty learning dataset information 203 (step S134).

Next, the duty recommendation model generation section 114 uses the train set input value 2032-2 as the input value and the duty ground truth value 2034-2 as the training value, and updates a parameter (the weight of a side) of the neural network by using a gradient descent method. This parameter update process is generally used in the neural network and will not be described in detail. The classifier 2042-2 is updated in this parameter update process (step S135).

The duty recommendation model generation section 114 is able to generate the classifier of the duty recommendation model by performing learning processing in the above-mentioned steps S134 and S135 on all pairs of train set input value and duty ground truth value, which are acquired from the duty learning dataset information 203. Further, as mentioned in the description of step S135, the duty recommendation model generation section 114 uses, as the input format and duty template for individual duty recommendation models, the input format 2031 and duty template 2033 stored together with the respective pairs as the duty learning dataset information 203.

Further, in duty recommendation model storage processing (step S107 of FIG. 8), the various types of information mentioned above are registered as various types of information (input format 2041, classifier 2042, and duty template 2043) regarding the duty recommendation model information 204 when a user operation is performed from the recommendation model attribute information correction screen 144. Moreover, the attribute information inputted by the user from the recommendation model attribute information correction screen 144 is registered as the attribute information 2044.

As described above, by exercising the prior learning function to perform the duty recommendation process, the resource management planning support device 1 according to the present embodiment is able to access a plurality of plan results stored as the learning plan result information 202 and generate the duty learning dataset according to each input format designated (selected) by the user from the input format selection screen 143. Additionally, by performing learning based on the duty learning dataset, the resource management planning support device 1 according to the present embodiment is able to automatically generate a model (duty recommendation model) that recommends a duty based on the input format. That is, the resource management planning support device 1 is able to generate a recommendation model effective for planning, from a variety of learning data including actual plans and simulation results.

(3-2) Planning Function (Planning Process)

This chapter describes the details of the planning function (planning process) according to the present embodiment.

When the planning process starts, the display section 16 displays the planning information selection screen 145, and allows the operation rescheduling planning target read section 121 to select a planning target according to a user selection made from the planning information selection screen 145 (step S108 of FIG. 8).

FIG. 20 depicts an example of the planning information selection screen. As depicted in FIG. 20, the planning information selection screen 145 is displayed such that a planning target can be selected from the planning information stored as the planning information 201. When the user selects desired target from the planning information selection screen 145 and then presses the "Next" button, the planning target selection is applied. For example, in a case where new planning information is registered as the planning information 201, the user is able to start creating a new operation rescheduling plan by selecting the new planning information as the planning target. When the planning target selection is applied, the operation rescheduling planning target read section 121 acquires a list of train set information corresponding to the selected planning information, from the planning information 201.

Next, the display section 16 displays the duty recommendation model selection screen 146, and allows the duty recommendation model selection section 122 to select a duty recommendation model according to a user selection from the duty recommendation model selection screen 146 (step S109).

FIG. 21 depicts an example of the duty recommendation model selection screen. As depicted in FIG. 21, the duty recommendation model selection screen 146 is displayed such that a duty recommendation model for use in current planning can be selected from duty recommendation models stored as the duty recommendation model information 204. When the user selects a duty recommendation model appropriate for current planning from the duty recommendation model selection screen 146 and then presses the "Start planning" button, the duty recommendation model selection is applied. A concrete example where the user selects a duty recommendation model appropriate for planning is described below. For example, in a case where the planning information selected from the planning information selection screen 145 is for "Regular day" of "YYYY fiscal year," a duty recommendation model to which a tag (attribute information) including "YYYY fiscal year compliant" and "For regular days" is added should be selected from the duty recommendation model selection screen 146.

As illustrated in FIG. 21, the duty recommendation model selection screen 146 displays not only the name of a selectable duty recommendation model but also information serving as criteria for user selection, such as "Tag" and "Memo," in order to assist the user in making a decision and provide support for making a more appropriate selection. This also holds true for the above-mentioned planning information selection screen 145 depicted in FIG. 20.

Subsequently, when the duty recommendation model selection is applied from the duty recommendation model selection screen 146, the duty recommendation model selection section 122 acquires the selected duty recommendation model from the duty recommendation model information 204.

Next, the operation rescheduling planning processing section 120 (e.g., the operation rescheduling planning section 124) selects, as the next target train set, a train set that is not yet subjected to planning, from among a plurality of train sets included in the train set information list acquired in step S108 (step S110). In this instance, for example, the operation rescheduling planning section 124 generates the planning target train set information 205 according to the train set information regarding the selected next train set. It should be noted that, as described later, the selection of the next train set in step S110 is repetitively made until planning is completed for all train sets included in the train set information list. The train set information regarding the selected next train set is sequentially added to the planning target train set information 205 each time the selection of the next train set is made.

Next, the operation rescheduling planning processing section 120 (e.g., the template priority list creation section 123 or the operation rescheduling planning section 124) generates train set input value information according to the input format for the duty recommendation model (step S111).

Next, the template priority list creation section 123 inputs, to the classifier of the duty recommendation model, the train set input value information generated in step S111, and then according to the output from the classifier, generates the duty template priority list information 206 (step S112).

Next, the operation rescheduling planning section 124 performs planning by adding the duty template regarding the selected target train set to the operation rescheduling plan according to the duty template priority list information 206 acquired in step S112 (step S113). In this instance, the operation rescheduling planning section 124 references the priority levels indicated in the duty template priority list information 206, and sequentially selects, as the duty template regarding the selected target train set, duty templates indicated under the duty template 2043 in the duty recommendation model information 204 in order from the highest-priority duty template to the lowest-priority duty template. It should be noted that the method of planning is not limited to a particular one. An already known planning technology may be used. More specifically, for example, a genetic algorithm may be used.

Next, the operation rescheduling planning section 124 determines whether or not a feasible plan is obtained by planning in step S113 (step S114). In a case where a feasible plan is obtained ("YES" in step S114), processing proceeds to step S116. On the other hand, in a case where no feasible plan is obtained ("NO" in step S114), processing proceeds to step S115 and then proceeds to step S116.

In step S115, the operation rescheduling planning section 124 concludes that the selected target train set does not permit automatic planning (is an unplannable train set), and requests the user to perform manual planning. In this instance, for example, the display section 16 may display a predetermined screen to prompt the user to manually create a plan. In a case where the plan is manually created by the user, the operation rescheduling planning section 124 adds the manually created plan to the operation rescheduling plan. It should be noted that step S115 is prepared as exception handling in the planning process according to the present embodiment. The reason is that, in a case where no feasible plan can be created by planning with the use of one duty template, the present embodiment repetitively performs planning by sequentially using other duty templates given a relatively high priority. Thus, in practice, it is unlikely that an unplannable train set will be encountered.

Subsequently, in step S116, the operation rescheduling plan storage section 125 determines whether or not planning is completed for all train sets included in the train set information list acquired in step S108. In a case where unplanned train sets are found ("NO" in step S116), the operation rescheduling plan storage section 125 adds the operation rescheduling plan created for the selected target train set, to the operation rescheduling plan temporary information 207, and then returns to step S110. In step S110, the next train set is selected from the unplanned train sets and processed as indicated in steps S111 to S115. When processing is repetitively performed as indicated in steps S110 to S116, planning is performed for individual train sets to sequentially add created operation rescheduling plans to the operation rescheduling plan temporary information 207.

Finally, when planning is completed for all the train sets ("YES" in step S116), the operation rescheduling plans stored as the operation rescheduling plan temporary information 207 are stored as the plan result information 208 by the operation rescheduling plan storage section 125. Upon completion of such storage, the planning process terminates.

Alternatively, the present embodiment may display the operation rescheduling plans created in the planning process to the user, by causing the display section 16 to display the plan result display screen 147 before storing the operation rescheduling plans as the plan result information 208. Further, the plan result display screen 147 may alternatively allow the user to determine whether or not to store the displayed operation rescheduling plans as the plan result information 208. Moreover, an additional function may alternatively be incorporated so as to be able to correct the attribute information regarding the recommendation model used for creating the operation rescheduling plans.

Figure 22:
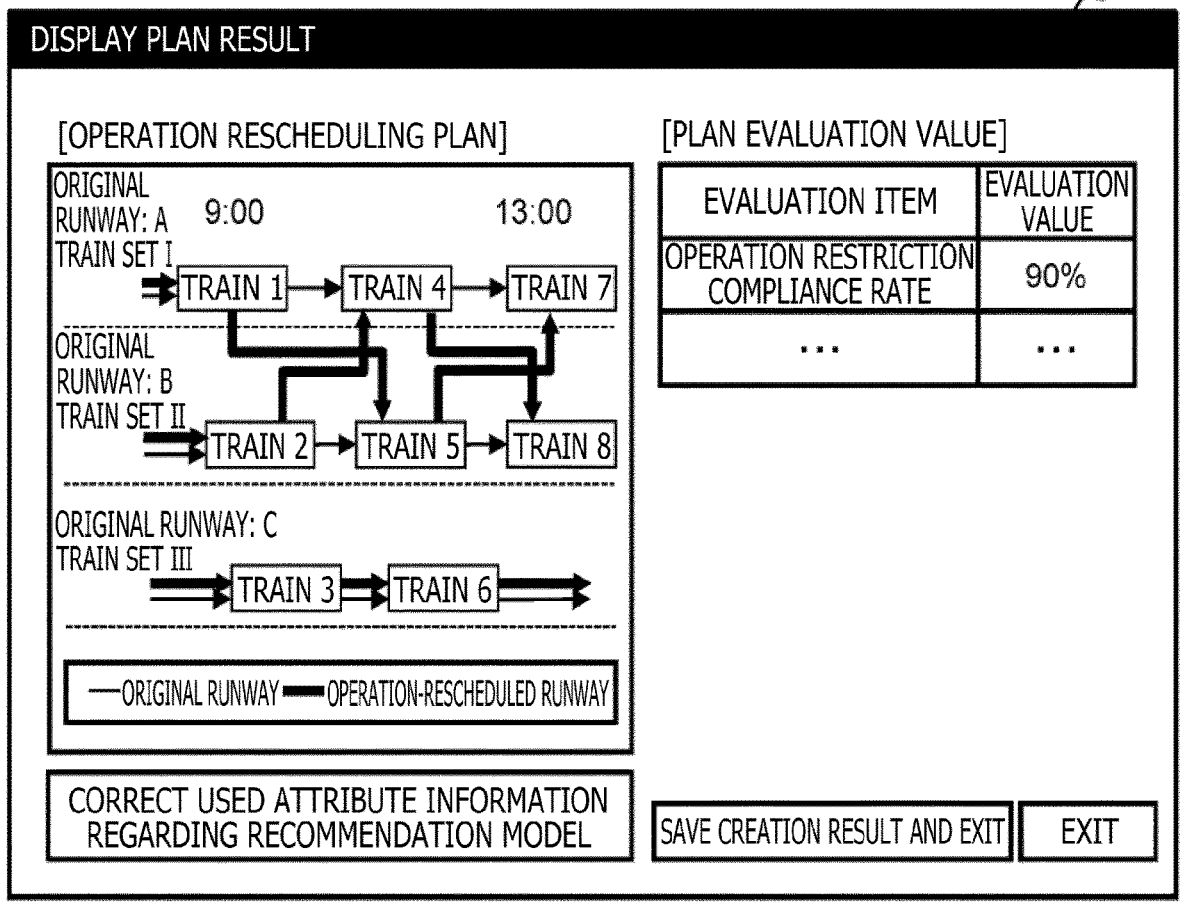
FIG. 22 depicts an example of a plan result display screen.

FIG. 22 depicts an example of the plan result display screen. As depicted in FIG. 22, the plan result display screen 147 displays an operation rescheduling plan that is created in the planning process and that is stored as the operation rescheduling plan temporary information 207. When the user presses the "Save creation result and exit" button on the plan result display screen 147, the storage of the displayed operation rescheduling plan as the plan result information 208 is applied. On the other hand, when the user presses the "Correct used attribute information regarding recommendation model" button, for example, the attribute information regarding the duty recommendation model used for creating the displayed operation rescheduling plan is newly displayed to allow the user to correct the attribute information.

Further, as depicted in FIG. 22, the plan result display screen 147 displays a plan evaluation value together with the operation rescheduling plan. The plan evaluation value is the value of evaluation of a predetermined evaluation item regarding the operation rescheduling plan (e.g., "Operation restriction compliance rate"). The evaluation is made, for example, by the operation rescheduling planning processing section 120. Displaying the plan evaluation value together with the operation rescheduling plan as described above assists the user in making a decision regarding the operation rescheduling plan.

FIG. 10 relates to the above-described planning process performed in steps S108 to S116 of FIG. 8, and depicts the relation between the related functional sections and data in an easy-to-understand manner. It should be noted that, in FIG. 10, the plan result information 208 is connected to the learning plan result information 202 by an arrow. It signifies that the operation rescheduling plans stored as the plan result information 208 in the planning process are duplicated as the learning plan result information 202. Consequently, the operation rescheduling plans created in the planning process can be used for learning in the next duty recommendation process. That is, the present embodiment is able to improve the accuracy of information acquired by various functions, by repetitively exercising the prior learning function and the planning function while allowing mutual use of the information.

(3-2-1) Generation of Duty Template Priority List Information

The following describes a concrete example of the steps that are performed in the above-described planning process to generate the duty template priority list information 206 in the above-described planning process. FIG. 23 is a diagram illustrating a method of generating the duty template priority list information.

As depicted in FIG. 23, according to the planning target selection in step S108 of FIG. 8, the list of train set information corresponding to the selected planning information is acquired from the planning information 201, and then, according to the next train set selected in step S110, one piece of train set information (a portion enclosed by a broken line in FIG. 23) is extracted from the list of train set information to generate planning target train set information 205-3.

Further, when a duty recommendation model selection is made in step S109 from the duty recommendation model selection screen 146, a duty recommendation model 2040-3 is acquired from the duty recommendation model information 204.

Subsequently, according to an input format indicated under an input format 2041-3 included in the duty recommendation model 2040-3, the train set input value information is generated from the train set information in the planning target train set information 205-3 (step S111). The train set input value information can be configured based, for example, on the train set input value 2032-1 depicted in FIG. 17. Moreover, FIG. 23 indicates that the external environment information can be acquired and reflected in the generation of the train set input value information.

Next, the train set input value information generated as described above is inputted to a classifier 2042-3 included in the duty recommendation model 2040-3, and then, an output value generated from the classifier 2042-3 is handled as a value indicative of a priority level in order to generate the duty template priority list information 206 (step S112).

(3-2-2) Generation of Plan Result Information

The following describes a concrete example of the steps that are performed in the above-described planning process to create an operation rescheduling plan and store the operation rescheduling plan as the plan result information 208. FIG. 24 is a diagram illustrating a method of generating the plan result information. FIG. 24 depicts the steps subsequent to the steps depicted in FIG. 23. Common components depicted in FIGS. 23 and 24 are designated by the same reference characters.

As depicted in FIG. 24, in step S113 of FIG. 8, the planning target train set information 205-3, a duty template 2043-3 included in the duty recommendation model 2040-3, and the duty template priority list information 206 are used as the input in order to perform planning by a predetermined method.

In the above instance, the duty template 2043-3 to be inputted for planning is selected according to the priority level of the duty template priority list information 206. More specifically, planning is performed, for example, by sequentially inputting duty templates indicated under the duty template 2043-3 in order from the highest-priority duty template to the lowest-priority duty template until a feasible plan is created.

When the feasible plan is created by planning, its operation rescheduling plan is added to the operation rescheduling plan temporary information 207, and planning is similarly performed for the next train set. It should be noted that, when subsequent planning is performed, the operation rescheduling plans for the individual train sets, which are stored as the operation rescheduling plan temporary information 207, can also be used as the input for planning.

Eventually, when planning is completed for all the train sets, the operation rescheduling plans accumulated as the operation rescheduling plan temporary information 207 are stored as the plan result information 208, and the planning process terminates. In this instance, the plan result display screen 147 may alternatively prompt the user to determine whether or not to store the accumulated operation rescheduling plans.

As described above, by exercising the planning function to perform the planning process, the resource management planning support device 1 according to the present embodiment is able to flexibly generate the duty template list indicative of priority levels (duty template priority list information 206) with the use of the duty recommendation model generated by the prior learning function, according to the planning target train set information and the input format designated (selected) by user. Further, by performing planning for individual target train sets with the use of the duty templates based on the priority levels, the resource management planning support device 1 according to the present embodiment is able to recommend, for the target train sets, a model similar to the learning data used by the prior learning function.

(4) CONCLUSION

As described above, the resource management planning support device 1 according to the present embodiment is able to exercise the prior learning function to automatically generate a duty recommendation model, and exercise the planning function to create an operation rescheduling plan by automatically selecting a duty template suitable for a target train set with the use of the duty recommendation model.

Further, the resource management planning support device 1 according to the present embodiment not only exercises the planning function to create an operation rescheduling plan based on a recommendation model generated by the prior learning function, but also evaluates a plan result of the created operation rescheduling plan in a predetermined manner and stores the result of evaluation (plan evaluation value) and the plan result as the plan result information 208. Then, the information stored as the plan result information 208 is stored also as the learning plan result information 202, and used subsequently for exercising the prior learning function. In this manner, the information stored as the plan result information 208 can be used as a feedback for the prior learning function. As a result, the prior learning function makes it possible to generate a recommendation model by following the result produced by the planning function. As described above, the resource management planning support device 1 according to the present embodiment is able to repetitively provide feedback between the prior learning function and the planning function, and is thus capable of automatically improving the accuracy of a product.

The above-described resource management planning support device 1 according to the present embodiment is able to create an operation rescheduling plan in consideration of various selections made by the user, even when the operation rescheduling plan involves a complicated combination of a plurality of decision variables. This can solve the first problem, which is mentioned earlier as a problem with the conventional technology.

Further, the resource management planning support device 1 according to the present embodiment is able to automatically achieve operation rescheduling planning in which problem modeling itself is difficult. This can solve the second problem, which is mentioned earlier as a problem with the conventional technology.

Moreover, the resource management planning support device 1 according to the present embodiment is able to exercise the prior learning function to generate a plurality of recommendation models according to the selection of original data, and exercise the planning function to select a desired recommendation model for use in planning from among a plurality of candidates. Therefore, even in a case where a train schedule change, an equipment change, or other environmental change occurs, an operation rescheduling plan can easily be created based on such an environmental change by adding original data and changing the selection. That is, it is not necessary to recreate a model at a great cost upon each environmental change. This can solve the third problem, which is mentioned earlier as a problem with the conventional technology.

It should be noted that the present invention is not limited to the foregoing embodiment and extends to various modifications. For example, the foregoing embodiment has been described in detail in order to facilitate the understanding of the present invention, and is not limited to a configuration including all the above-described components. Further, some components of the foregoing embodiment may be subjected to the addition of other components, deleted, or replaced by other components.

Further, for example, the above-described components, functions, processing sections, and processing means may be partly or wholly implemented by hardware, that is, for example, by designing them with integrated circuits. Moreover, for example, the above-described components and functions may be implemented by software by allowing a computer processor to interpret and execute programs for implementing individual functions. Information regarding, for example, programs, tables, and files for implementing the individual functions may be stored in a recording device such as a memory, a hard disk, or an SSD (Solid State Drive), or in a recording medium such as an IC card, an SD card, or a DVD.

Additionally, control lines and information lines considered necessary for explanation are depicted in the drawings. All the control lines and information lines required for products are not necessarily depicted in the drawings. For implementation, it can be considered that almost all of the components are interconnected.

DESCRIPTION OF REFERENCE CHARACTERS

1: Resource management planning support device
11: CPU
12: Memory
13: Storage section
14: Communication section
15: Input section
16: Display section
17: Communication line
20: Communication network
100: Program
110: Duty recommendation processing section
111: Learning plan result read section
112: Input format selection section
113: Duty learning dataset generation section
114: Duty recommendation model generation section
115: Duty recommendation model storage section
120: Operation rescheduling planning processing section
121: Operation rescheduling planning target read section
122: Duty recommendation model selection section
123: Template priority list creation section
124: Operation rescheduling planning section
125: Operation rescheduling plan storage section
130: Function switching processing section
140: Screen processing section
141: Function selection screen
142: Learning plan result selection screen
143: Input format selection screen
144: Recommendation model attribute information correction screen
145: Planning information selection screen
146: Duty recommendation model selection screen
147: Plan result display screen
201: Planning information
202: Learning plan result information
203: Duty learning dataset information
204: Duty recommendation model information
205: Planning target train set information
206: Duty template priority list information
207: Operation rescheduling plan temporary information
208: Plan result information
2021: Plan result information
2022: Duty information
2023: Plan evaluation value
2031: Input format
2032: Train set input value
2033: Duty template
2034: Duty ground truth value
2041: Input format
2042: Classifier
2043: Duty template
2044: Attribute information

The invention claimed is:

1. A resource management planning support device that creates an operation rescheduling plan for a train set, the resource management planning support device comprising:
a memory that stores plan result information regarding an existing operation rescheduling plan;
a display; and
a processor communicatively coupled to the memory and the display, wherein the processor is configured to:
exercise a prior learning function to generate duty recommendation models for recommending a duty,
exercise a planning function to create an operation rescheduling plan by selecting at least one of a plurality of duty templates suitable for each of a plurality of planning target train sets according to the duty recommendation models generated,
output a plan result display screen for displaying, via the display, the operation rescheduling plan created,
generate, for each input format of a plurality of input formats designated by a user, a duty learning dataset including a respective input format and at least one of the plurality of duty templates, based on the plan result information stored in the memory,
generate a duty recommendation model including a classifier configured to learn at least one of the plurality of duty templates based on the respective input format from the duty learning dataset,
generate, for each of the plurality of planning target train sets, a train set input value based on an input format of the duty recommendation model from information regarding a corresponding planning target train set,
input the generated train set input value to the classifier included in the duty recommendation model,
create a template priority list of priority levels of each of the plurality of duty templates, the priority levels being obtained as output from the classifier,
preferentially select, based on the template priority list created, one of the plurality of duty templates having a high priority level indicated in the template priority list,
create a plan for each of the plurality of planning target train sets,
create the operation rescheduling plan for each of the plurality of planning target train sets,
output, via the display, a recommendation model selection screen that allows the user to select one duty recommendation model for use with the planning function, from the duty recommendation models generated with use of the prior learning function, and
generate the template priority list by using the duty recommendation model selected from the recommendation model selection screen.

2. The resource management planning support device according to claim 1, wherein plan result information regarding the operation rescheduling plan created by the planning function is stored in the memory and is subsequently available to the prior learning function.

3. The resource management planning support device according to claim 1, wherein
the processor outputs, via the display, a learning plan result selection screen that allows the user to select one or more pieces of the plan result information for use with the prior learning function, from among a plurality of pieces of the plan result information stored in the memory,
the learning plan result selection screen additionally displays an evaluation value as supplementary information for each piece of the plan result information regarded as a selection candidate, the evaluation value being derived from a predetermined evaluation of each piece of the plan result information, and
the processor generates the duty learning dataset by using the plan result information selected from the learning plan result selection screen.

4. The resource management planning support device according to claim 1, wherein
the processor further adds user-designated attribute information to at least one of the duty recommendation models generated and stores a result of the user-designated attribute information in the memory, and
the recommendation model selection screen additionally displays, via the display, as supplementary information for each of the duty recommendation models regarded as a selection candidate, a corresponding piece of the user-designated attribute information.

5. The resource management planning support device according to claim 1, wherein
the processor outputs an input format selection screen, via the display, that allows the user to designate the input format necessary to generate the duty learning dataset, and
items of the input format that are enabled to be designated from the input format selection screen include an input item that relates to external environment and that is externally acquirable, in addition to an input item regarding the train set and an input item regarding the operation rescheduling plan.

6. The resource management planning support device according to claim 1, wherein the processor causes the plan result display screen to display the operation rescheduling plan created and an evaluation value derived from a predetermined evaluation of the operation rescheduling plan.

7. The resource management planning support device according to claim 1, wherein the duty learning dataset includes the input format designated by the user, the train set input value derived from a real value of each of a plurality of train sets based on the input format, a duty template that is generated by repetitively executing a search and an update on each of a plurality of train set duties extracted from the plan result information stored in the memory, the search using a predetermined search key, and a duty ground truth value indicating a correspondence between the duty template and a plan result.

8. The resource management planning support device according to claim 4, wherein the duty recommendation model includes the input format, the classifier, the at least one the plurality of duty templates, and the user-designated attribute information.

9. A resource management planning support method for creating an operation rescheduling plan for a train set, the resource management planning support method being performed by a resource management planning support device, the resource management planning support method comprising:
a learning information storage step of storing, via a memory, plan result information regarding an existing operation rescheduling plan;
a duty recommendation processing step of exercising, via a processor, a prior learning function to generate duty recommendation models for recommending a duty;
a planning processing step of exercising, via the processor, a planning function to create an operation rescheduling plan by selecting at least one of a plurality of duty templates suitable for each of a plurality of planning target train sets according to the duty recommendation models generated in the duty recommendation processing step; and
a plan result display step of displaying, via a display, the operation rescheduling plan created in the planning processing step, wherein
the duty recommendation processing step includes
a duty learning dataset generation step of generating, for each input format of a plurality of input formats designated by a user, a duty learning dataset including a respective input format and at least one of the plurality of duty templates, based on the plan result information stored in the learning information storage step, and
a duty recommendation model generation step of generating the duty recommendation models including a classifier configured to learn at least one of the plurality of duty templates based on the respective input format from the duty learning dataset generated in the duty learning dataset generation step, and
the planning processing step includes
a template priority list creation step of generating, for each of the plurality of planning target train sets, a train set input value based on an input format of the duty recommendation models from information regarding a corresponding planning target train set, inputting the generated train set input value to the classifier included in the duty recommendation models, and creating a template priority list of priority levels of each of the plurality of duty templates, the priority levels being obtained as output from the classifier, and
an operation rescheduling planning step of preferentially selecting, based on the template priority list created for each of the plurality of planning target train sets, one of the plurality of duty templates having a high priority level indicated in the template priority list, creating a plan for each of the plurality of planning target train sets, and creating the operation rescheduling plan for each of the plurality of planning target train sets; and
a recommendation model selection step that allows the user to select one duty recommendation model for use with the planning function, from among a plurality of the duty recommendation models generated with use of the prior learning function, and generate the template priority list by using the duty recommendation model selected.

10. A non-transitory computer readable storage medium storing instructions for creating an operation rescheduling plan for a train set, the instructions when executed by a processor causing the processor to execute a method comprising:

a learning information storage step of storing, via a memory, plan result information regarding an existing operation rescheduling plan;

a duty recommendation processing step of exercising, via a processor, a prior learning function to generate duty recommendation models for recommending a duty;

a planning processing step of exercising, via the processor, a planning function to create an operation rescheduling plan by selecting at least one of a plurality of duty templates suitable for each of a plurality of planning target train sets according to the duty recommendation models generated in the duty recommendation processing step; and a plan result display step of displaying, via a display, the operation rescheduling plan created in the planning processing step, wherein the instructions for executing the duty recommendation processing step include a duty learning dataset generation process of generating, for each input format of a plurality of input formats designated by a user, a duty learning dataset including a respective input format and at least one of the plurality of duty templates, based on the plan result information stored in the learning information storage step, and a duty recommendation model generation process of generating the duty recommendation models including a classifier configured to learn at least one of the plurality of duty templates based on the respective input format from the generated duty learning dataset, and the instructions for executing the planning processing step include a template priority list creation process of generating, for each of the plurality of planning target train sets, a train set input value based on an input format of the duty recommendation model from information regarding a corresponding planning target train set, inputting the generated train set input value to the classifier included in the duty recommendation model, and creating a template priority list of priority levels of each of the plurality of duty templates, the priority levels being obtained as output from the classifier, and an operation rescheduling planning process of preferentially selecting, based on the template priority list created for each of the plurality of planning target train sets, one of the plurality of duty templates having a high priority level indicated in the template priority list, creating a plan for each of the plurality of planning target train sets, and creating the operation rescheduling plan for each of the plurality of planning target train sets; and a recommendation model selection process that allows the user to select one duty recommendation model for use with the planning function, from among a plurality of the duty recommendation models generated with use of the prior learning function, and generate the template priority list by using the duty recommendation model selected.

11. A resource management planning support device that creates an operation rescheduling plan for a train set, the resource management planning support device comprising:

a memory that stores plan result information regarding an existing operation rescheduling plan;

a display; and a processor communicatively coupled to the memory and the display, wherein the processor is configured to:

exercise a prior learning function to generate duty recommendation models for recommending a duty, exercise a planning function to create an operation rescheduling plan by selecting at least one of a plurality of duty templates suitable for each of a plurality of planning target train sets according to the duty recommendation models generated, output a plan result display screen for displaying, via the display, the operation rescheduling plan created, generate, for each input format of a plurality of input formats designated by a user, a duty learning dataset including a respective input format and at least one of the plurality of duty templates, based on the plan result information stored in the memory, wherein the duty learning dataset includes the respective input format designated by the user, a train set input value derived from a real value of each of a plurality of train sets based on the respective input format, a duty template that is generated by repetitively executing a search and an update on each of a plurality of train set duties extracted from the plan result information stored in the memory, the search using a predetermined search key, and a duty ground truth value indicating a correspondence between the duty template and a plan result, generate a duty recommendation model including a classifier configured to learn at least one of the plurality of duty templates based on the respective input format from the duty learning dataset, generate, for each of the plurality of planning target train sets, a train set input value based on the respective input format of the duty recommendation model from information regarding a corresponding planning target train set, input the generated train set input value to the classifier included in the duty recommendation model, and create a template priority list of priority levels of each of the plurality of duty templates, the priority levels being obtained as output from the classifier, preferentially select, based on the template priority list created for each of the plurality of planning target train sets, one of the plurality of duty templates having a high priority level indicated in the template priority list, create a plan for each of the plurality of planning target train sets, and create the operation rescheduling plan for each of the plurality of planning target train sets, output, via the display, a recommendation model selection screen that allows the user to select one duty recommendation model for use with the planning function, from the duty recommendation models generated with use of the prior learning function, and generate the template priority list by using the duty recommendation model selected from the recommendation model selection screen.

12. A resource management planning support method for creating an operation rescheduling plan for a train set, the resource management planning support method being performed by a resource management planning support device, the resource management planning support method comprising:

a learning information storage step of storing, via a memory, plan result information regarding an existing operation rescheduling plan;

a duty recommendation processing step of exercising, via a processor, a prior learning function to generate duty recommendation models for recommending a duty;

a planning processing step of exercising, via the processor, a planning function to create an operation rescheduling plan by selecting at least one of a plurality of duty templates suitable for each of a plurality of planning target train sets according to the duty recommendation models generated in the duty recommendation processing step; and a plan result display step of displaying, via a display, the operation rescheduling plan created in the planning processing step, wherein the duty recommendation processing step includes a duty learning dataset generation step of generating, for each input format of a plurality of input formats designated by a user, a duty learning dataset including a respective input format and at least one of the plurality of duty templates, based on the plan result information stored in the learning information storage step, wherein the duty learning dataset includes the respective input format designated by the user, a train set input value derived from a real value of each of a plurality of train sets based on the respective input format, a duty template that is generated by repetitively executing a search and an update on each of a plurality of train set duties extracted from the plan result information stored in the memory, the search using a predetermined search key, and a duty ground truth value indicating a correspondence between the duty template and a plan result, and a duty recommendation model generation step of generating the duty recommendation models including a classifier configured to learn at least one of the plurality of duty templates based on the respective input format from the duty learning dataset generated in the duty learning dataset generation step, and the planning processing step includes a template priority list creation step of generating, for each of the plurality of planning target train sets, a train set input value based on the respective input format of the duty recommendation models from information regarding a corresponding planning target train set, inputting the generated train set input value to the classifier included in the duty recommendation models, and creating a template priority list of priority levels of each of the plurality of duty templates, the priority levels being obtained as output from the classifier, and an operation rescheduling planning step of preferentially selecting, based on the template priority list created for each of the plurality of planning target train sets, one of the plurality of duty templates having a high priority level indicated in the template priority list, creating a plan for each of the plurality of planning target train sets, and creating the operation rescheduling plan for each of the plurality of planning target train sets, a recommendation model selection step that allows the user to select one duty recommendation model for use with the planning function, from among a plurality of the duty recommendation models generated with use of the prior learning function, and generate the template priority list by using the duty recommendation model selected.

13. A non-transitory computer readable storage medium storing instructions for creating an operation rescheduling plan for a train set, the instructions when executed by a processor causing the processor to execute a method comprising:

a learning information storage step of storing, via a memory, plan result information regarding an existing operation rescheduling plan;

a duty recommendation processing step of exercising, via a processor, a prior learning function to generate duty recommendation models for recommending a duty;

a planning processing step of exercising, via the processor, a planning function to create an operation rescheduling plan by selecting at least one of a plurality of duty templates suitable for each of a plurality of planning target train sets according to the duty recommendation models generated in the duty recommendation processing step; and a plan result display step of displaying, via a display, the operation rescheduling plan created in the planning processing step, wherein the instructions for executing the duty recommendation processing step include a duty learning dataset generation process of generating, for each input format of a plurality of input formats designated by a user, a duty learning dataset including a respective input format and at least one of the plurality of duty templates, based on the plan result information stored in the learning information storage step, wherein the duty learning dataset includes the respective input format designated by the user, a train set input value derived from a real value of each of a plurality of train sets based on the respective input format, a duty template that is generated by repetitively executing a search and an update on each of a plurality of train set duties extracted from the plan result information stored in the memory, the search using a predetermined search key, and a duty ground truth value indicating a correspondence between the duty template and a plan result, and a duty recommendation model generation process of generating the duty recommendation models including a classifier configured to learn at least one of the plurality of duty templates based on the respective input format from the generated duty learning dataset, and the instructions for executing the planning processing step include a template priority list creation process of generating, for each of the plurality of planning target train sets, a train set input value based on the respective input format of a duty recommendation model from information regarding a corresponding planning target train set, inputting the generated train set input value to the classifier included in the duty recommendation model, and creating a template priority list of priority levels of each of the plurality of duty templates, the priority levels being obtained as output from the classifier, and an operation rescheduling planning process of preferentially selecting, based on the template priority list created for each of the plurality of planning target train sets, one of the plurality of duty templates having a high priority level indicated in the template priority list, creating a plan for each of the plurality of planning target train sets, and creating the operation rescheduling plan for each of the plurality of planning target train sets, a recommendation model selection process that allows the user to select one duty recommendation model for use with the planning function, from among a plurality of the duty recommendation models generated with use of the prior learning function, and generate the template priority list by using the duty recommendation model selected.

* * * * *